(12) United States Patent
Yamamuro et al.

(10) Patent No.: US 12,445,291 B2
(45) Date of Patent: Oct. 14, 2025

(54) DATA MANAGEMENT DEVICE, DATA MANAGEMENT METHOD, AND NON-TRANSITORY STORAGE MEDIUM

(71) Applicants: TOYOTA JIDOSHA KABUSHIKI KAISHA, Toyota (JP); Scalar, Inc., Tokyo (JP)

(72) Inventors: Naoki Yamamuro, Nagoya (JP); Shigeki Matsumoto, Nagoya (JP); Yohei Nakanishi, Nagoya (JP); Kazuya Kumazawa, Nagoya (JP); Wataru Fukatsu, Tokyo (JP)

(73) Assignees: TOYOTA JIDOSHA KABUSHIKI KAISHA, Toyota (JP); SCALAR, INC., Shinjuku-ku (JP)

( * ) Notice: Subject to any disclaimer, the term of this patent is extended or adjusted under 35 U.S.C. 154(b) by 67 days.

(21) Appl. No.: 18/622,270

(22) Filed: Mar. 29, 2024

(65) Prior Publication Data
US 2024/0333516 A1    Oct. 3, 2024

(30) Foreign Application Priority Data
Apr. 3, 2023   (JP) ................................. 2023-060208

(51) Int. Cl.
*H04L 29/06*   (2006.01)
*H04L 9/00*    (2022.01)
*H04L 9/32*    (2006.01)

(52) U.S. Cl.
CPC .......... *H04L 9/3236* (2013.01); *H04L 9/3213* (2013.01); *H04L 9/3297* (2013.01); *H04L 9/50* (2022.05)

(58) Field of Classification Search
None
See application file for complete search history.

(56) References Cited

U.S. PATENT DOCUMENTS 11,711,221 B1 *   7/2023   Griffin ...................... H04L 9/50
                                                              713/178
11,823,120 B2 *  11/2023   Padmanabhan ...... G06Q 10/087
(Continued)

FOREIGN PATENT DOCUMENTS

JP        6694204 B1      5/2020

OTHER PUBLICATIONS

Xu, Shuaijianni et al. Research on the Application of Blockchain Smart Contract in Software Supply Chain Management. 2022 3rd Asia Conference on Computers and Communications (ACCC). https://ieeexplore.ieee.org/stamp/stamp.jsp?tp=&arnumber=10071594 (Year: 2022).*

(Continued)

*Primary Examiner* — Jeremiah L Avery
(74) *Attorney, Agent, or Firm* — Sughrue Mion, PLLC

(57) ABSTRACT

A device includes: a storage storing a distributed ledger, the distributed ledger including a plurality of evidence chains and a time stamp chain, the plurality of evidence chains storing in chronological order at least one hash value, the time stamp chain storing in chronological order at least one time stamp token; and a processor configured to repeatedly execute an update process such that the time stamp chain is updated, the update process including a process for identifying, out of the evidence chains, at least one evidence chain in which the hash value has been changed with a change in the file since previous execution of the update process, and acquiring the time stamp token for a terminal value generated based on a terminal hash value of the at least one evidence chain.

12 Claims, 28 Drawing Sheets

(56) References Cited

U.S. PATENT DOCUMENTS

| | | | |
|---|---|---|---|
| 11,831,779 B2* | 11/2023 | Yadav | H04L 9/3231 |
| 11,985,263 B1* | 5/2024 | Liu | H04L 9/3239 |
| 12,002,047 B1* | 6/2024 | Yotov | H04L 9/3239 |
| 12,010,244 B2* | 6/2024 | Androulaki | H04L 9/30 |
| 12,026,700 B2* | 7/2024 | Maim | G06F 21/51 |
| 12,118,127 B1* | 10/2024 | Cordi | H04L 9/3297 |
| 12,147,435 B2* | 11/2024 | Kamijoh | G06F 16/242 |
| 12,200,141 B2* | 1/2025 | Fletcher | H04L 9/3247 |
| 12,321,933 B2* | 6/2025 | Cheng | H04L 9/50 |
| 12,346,298 B2* | 7/2025 | Covaci | H04L 9/3273 |
| 12,354,163 B1* | 7/2025 | Paya | G06Q 20/3825 |
| 2022/0012731 A1* | 1/2022 | DeRosa-Grund | G06F 16/2365 |
| 2022/0123991 A1 | 4/2022 | Yamada | |
| 2024/0005309 A1* | 1/2024 | Osborn | G06Q 20/065 |
| 2024/0070306 A1* | 2/2024 | Jurat | G06F 21/6218 |
| 2024/0080210 A1* | 3/2024 | Sharpe | H04L 41/16 |
| 2024/0080361 A1* | 3/2024 | Chen | H04L 67/1095 |
| 2024/0104653 A1* | 3/2024 | Suto | G06Q 20/1235 |
| 2024/0185191 A1* | 6/2024 | Bernardi | H04L 9/50 |

OTHER PUBLICATIONS

Ismail, Shereen; Reza, Hassan. Security Challenges of Blockchain-Based Supply Chain Systems. 2022 IEEE 13th Annual Ubiquitous Computing, Electronics & Mobile Communication Conference (UEMCON). https://ieeexplore.ieee.org/stamp/stamp.jsp?tp=&arnumber=9965682 (Year: 2022).*

Jain, Apoorv et al. Smart Contract enabled Online Examination System Based in Blockchain Network. 2021 International Conference on Computer Communication and Informatics (ICCCI). https://ieeexplore.ieee.org/stamp/stamp.jsp?tp=&arnumber=9402420 (Year: 2021).*

* cited by examiner

FIG. 25

DISTRIBUTED LEDGER

EVIDENCE CHAIN X — 63X

| Key | Age | Data | Nonce | Sig | Prev-RH | RH |
|---|---|---|---|---|---|---|
| kx | | FHx(N) | | | – | hx(N) |
| kx | | FHx(N+2) | | | hx(N) | hx(N+2) |
| kx | | FHx(N+3) | | | hx(N+2) | hx(N+3) |

EVIDENCE CHAIN Y — 63Y

| Key | Age | Data | Nonce | Sig | Prev-RH | RH |
|---|---|---|---|---|---|---|
| ky | | FHy(N+1) | | | – | hy(N+1) |
| ky | | FHy(N+2) | | | hy(N+1) | hy(N+2) |

EVIDENCE CHAIN Z — 63Z

| Key | Age | Data | Nonce | Sig | Prev-RH | RH |
|---|---|---|---|---|---|---|
| kz | | FHz(N) | | | – | hz(N) |
| kz | | FHz(N+1) | | | hz(N) | hz(N+1) |
| kz | | FHz(N+2) | | | hz(N+1) | hz(N+2) |

TIME STAMP CHAIN — 64

| Key | Age | Data | Nonce | Sig | Prev-RH | RH | |
|---|---|---|---|---|---|---|---|
| k4 | | hx(N), hz(N) | | | – | H(N) | R41 |
| k4 | | TS(N) | | | H(N) | H(N+1) | R42 |
| k4 | | hy(N+1), hz(N+1) | | | H(N+1) | H(N+2) | R43 |
| k4 | | TS(N+1) | | | H(N+2) | H(N+3) | R44 |
| k4 | | hx(N+2), hz(N+2) | | | H(N+3) | H(N+4) | R45 |
| k4 | | TS(N+2) | | | H(N+4) | H(N+5) | R46 |
| k4 | | hx(N+3), hy(N+3) | | | H(N+5) | H(N+6) | R47 |
| k4 | | TS(N+3) | | | H(N+6) | H(N+7) | R48 |

DATA MANAGEMENT DEVICE, DATA MANAGEMENT METHOD, AND NON-TRANSITORY STORAGE MEDIUM

CROSS-REFERENCE TO RELATED APPLICATION

This application claims priority to Japanese Patent Application No. 2023-060208 filed on Apr. 3, 2023, incorporated herein by reference in its entirety.

BACKGROUND

1. Technical Field

The present disclosure relates to a data management device, a data management method, and a non-transitory storage medium and more particularly to a data management device, a data management method, and a non-transitory storage medium that use distributed ledger technology (DLT).

2. Description of Related Art

Japanese Patent No. 6694204 (JP 6694204 B) discloses a data management system to which distributed ledger technology is applied.

SUMMARY

Data management devices or data management methods have been proposed that manage data (files and times of confirmation) using the distributed ledger technology. When a distributed ledger including a plurality of ledgers (chains that will be described later) is used, there is a demand to efficiently prove the ordering of data.

The present disclosure provides a data management device, a data management method and a non-transitory storage medium that efficiently prove the ordering of data when a distributed ledger including a plurality of ledgers is used.

A data management device according to a first aspect of the present disclosure includes: a storage storing a distributed ledger, the distributed ledger including a plurality of evidence chains and a time stamp chain, the plurality of evidence chains storing in chronological order at least one hash value, the time stamp chain storing in chronological order at least one time stamp token, each hash value being generated from a file, and each time stamp token certifying a time of confirmation; and a processor configured to repeatedly execute an update process such that the time stamp chain is updated, the update process including a process for identifying, out of the evidence chains, at least one evidence chain in which the hash value has been changed with a change in the file since previous execution of the update process, and acquiring the time stamp token for a terminal value generated based on a terminal hash value of the at least one evidence chain.

When the processor generates the terminal value, the processor may be configured not to use the terminal hash value that has not been changed since the previous execution of the update process.

In the above configuration, a time stamp token(s) is (are) acquired for the evidence chain(s) whose file has been changed since the previous execution of the update process, while no time stamp token is acquired for the evidence chain(s) whose file has not been changed since the previous execution of the update process. This reduces the cost of acquiring a time stamp token(s) for the evidence chain(s) whose file has not been changed. According to the above configuration, it is therefore possible to efficiently prove the ordering of files and times of confirmation.

The processor may be configured to execute the update process every predetermined period.

In the above configuration, the update process is executed regularly. This can reduce the verification cost compared to the case where the update process is executed every time any file is changed. In addition, verification can be performed steadily over a long period of time compared to the case where the update process is executed irregularly.

The processor may be configured to execute a first verification process, a second verification process, and a third verification process, the first verification process is a process for verifying whether at least one file generated from the at least one hash value has been tampered with, the second verification process is a process for verifying whether at least one time of confirmation certified by the at least one timestamp token has been tampered with, and the third verification process is a process for verifying ordering of the at least one file and the at least one time of confirmation.

In the above configuration, the integrity of the file(s) (whether the file(s) has (have) been tampered with) can be verified by the first verification process. The integrity of the time(s) of confirmation (whether the time(s) of confirmation has (have) been tampered with) can be verified by the second verification process. The ordering of the file(s) and time(s) of confirmation in the distributed ledger can be verified by the third verification process. According to the above configuration, it is therefore possible to verify whether the files and the times of confirmation are properly managed.

The processor may be configured to execute at least one out of the first to third verification processes according to an operation of a user on an input device.

In the above configuration, at least one out of the first to third verification processes is executed according to the user's operation. Therefore, according to the above configuration, verification requested by the user can be performed at the timing desired by the user.

When a first user operation is performed on the input device, the processor may be configured to execute the first to third verification processes on part of the at least one file and the at least one time of confirmation that are selected by the user.

In the above configuration, when the first user operation is performed, an object to be verified is limited to part of the files and/or part of the times of confirmation that is selected by the user. This reduces the verification cost (workload, time, system load, etc.) compared to the case where all the files and all the times of confirmation are subject to verification. According to the above configuration, it is therefore possible to efficiently verify whether the files and the times of confirmation are properly managed.

When two or more files are selected by the user, the processor may be configured to subject at least an oldest file, the time of confirmation immediately before the oldest file, a most recent file, and the time of confirmation immediately after the most recent file to verification.

In the above configuration, the time of confirmation immediately before the oldest file and the time of confirmation immediately after the most recent file are to be verified. It is therefore possible to prove, out of the two or more files selected by the user, which file(s) existed and which file(s) did not at the time of confirmation immediately before the oldest file and the time of confirmation immediately after the most recent file. In other words, it is possible to prove that the two or more files selected by the user were stored in the distributed ledger between the time of confirmation immediately before the oldest file and the time of confirmation immediately after the most recent file. According to the present embodiment, it is therefore possible to effectively verify the ordering of the files and times of confirmation with a simple user operation.

When there is another time of confirmation between the two or more files, the processor may be further configured to subjects the another time of confirmation to the verification.

In the above configuration, the another time of confirmation that is present between the two or more files is also verified. It is therefore possible to prove which file(s) existed and which file(s) did not at the another time of confirmation. According to the above configuration, it is therefore possible to verify the ordering of the files and times of confirmation in more detail.

When a second user operation is performed on the input device, the processor may be configured to execute the first to third verification processes on all of the at least one file and the at least one time of confirmation.

In the above configuration, when the second user operation is performed, the integrity of all the files and the integrity of all the times of confirmation are verified. According to the above configuration, it is therefore possible to thoroughly verify the integrity of the files and times of confirmation.

When a third user operation is performed on the input device, the processor may be configured to execute the third verification process but does not execute the first verification process and the second verification process.

In the above configuration, when the third user operation is performed, the ordering of the files and times of confirmation is selectively verified. According to the above configuration, it is therefore possible to efficiently verify the ordering of the files and times of confirmation when verification of the integrity of the files and times of confirmation is not requested.

A data management method according to a second aspect of the present disclosure includes: identifying, out of a plurality of evidence chains, at least one evidence chain in which a hash value has been changed with a change in a file since previous execution of an update process for updating a time stamp chain, the plurality of evidence chains storing in chronological order at least one hash value, the time stamp chain storing in chronological order at least one time stamp token, and the plurality of evidence chains and the time stamp chain being included in a distributed ledger, each hash value being generated from a file, and each time stamp token certifying a time of confirmation; and acquiring the time stamp token for a terminal value generated based on a terminal hash value of the at least one evidence chain.

Like the configuration of the first aspect, according to the above method, it is possible to efficiently prove the ordering of data when a distributed ledger including a plurality of ledgers is used.

A non-transitory storage medium, according to a third aspect of the present disclosure, storing instructions that are executable by one or more processors and that cause the one or more processors to perform functions includes: identifying, out of a plurality of evidence chains, at least one evidence chain in which a hash value has been changed with a change in a file since previous execution of an update process for updating a time stamp chain, the plurality of evidence chains storing in chronological order at least one hash value, the time stamp chain storing in chronological order at least one time stamp token, and the plurality of evidence chains and the time stamp chain being included in a distributed ledger, each hash value being generated from a file, and each time stamp token certifying a time of confirmation; and acquiring the time stamp token for a terminal value generated based on a terminal hash value of the at least one evidence chain.

According to the present disclosure, it is possible to efficiently prove the ordering of data when a distributed ledger including a plurality of ledgers is used.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 25 shows an example of the data structure of a distributed ledger of a second embodiment;

DETAILED DESCRIPTION OF EMBODIMENTS

An embodiment of the present disclosure will be described in detail below with reference to the drawings. The same or corresponding portions are denoted by the same signs throughout the drawings, and description thereof will not be repeated.

First Embodiment

System Configuration

Figure 1:
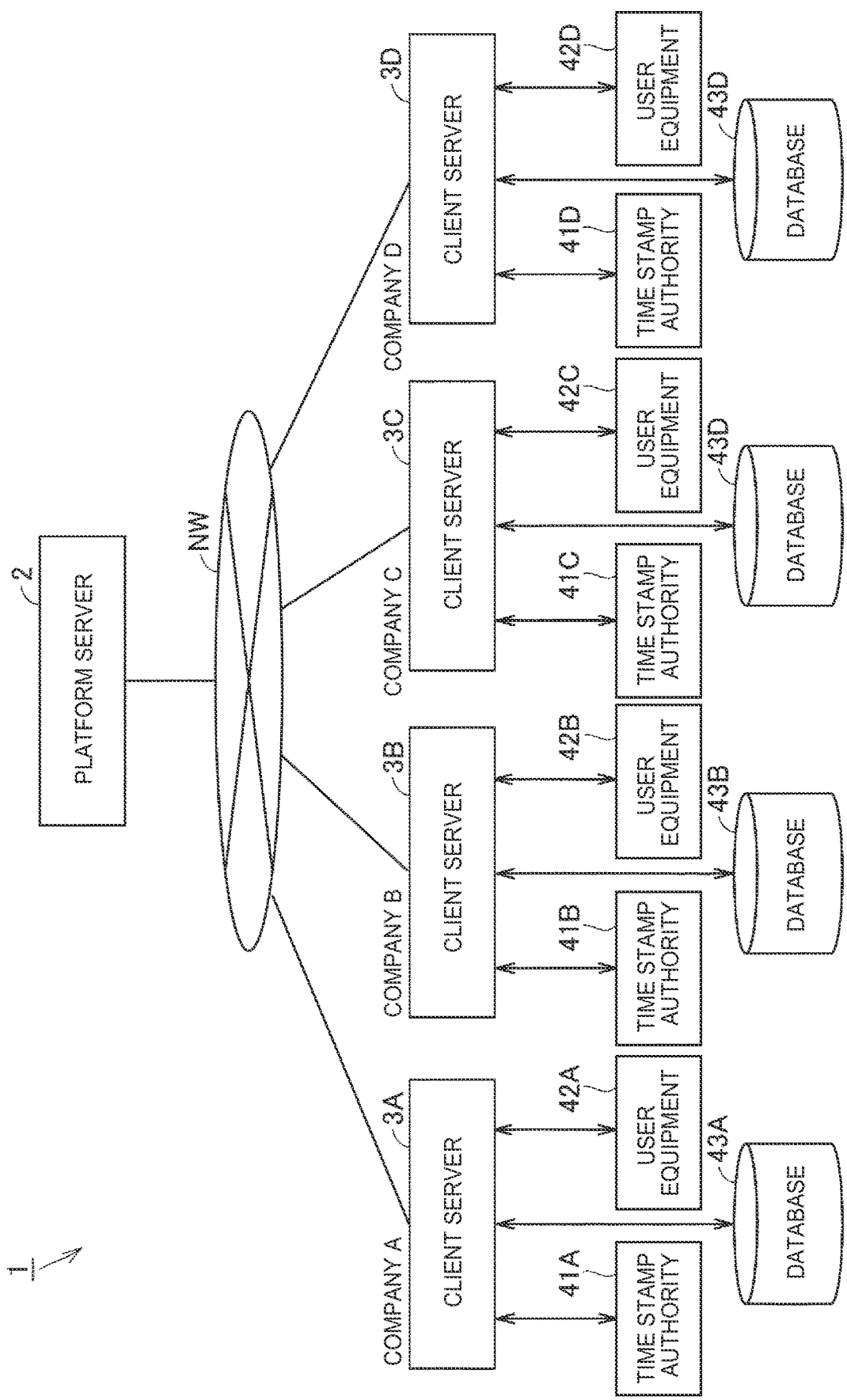
FIG. 1 shows an example of the overall configuration of a data management system according to a first embodiment of the present disclosure.

FIG. 1 shows an example of the overall configuration of a data management system according to a first embodiment of the present disclosure. The data management system 1 is a system that manages data using distributed ledger technology. The data that is managed by the data management system 1 is files and times of confirmation. The type and data format of the files are not particularly limited. The files may be design data for vehicles (or vehicle parts), control programs for vehicles, or document files describing vehicle specifications or vehicle development know-how. The time of confirmation is the time (typically the time including year, month, date, hour, minute, and second) certified by a time stamp token acquired from a Time Stamp Authority (TSA). The time of confirmation may also be called date of confirmation.

The data management system 1 includes, for example, a platform server 2 and a plurality of client servers 3A to 3D. In this example, the data management system 1 includes four client servers. However, the number of client servers is not limited as long as it is two or more.

The platform server 2 manages a network NW. The network NW is, for example, a consortium network formed between or among a plurality of companies. The platform server 2 accepts applications for participation in the network NW from the client servers. The platform server 2 permits the client servers to participate in the network NW based on an operation performed by an administrator of the platform server 2 or based on the determination result as to whether a predetermined condition is satisfied.

The four client servers 3A to 3D are servers belonging to companies A to D, respectively. Distributed ledger-based software is installed in the client servers 3A to 3D. As the distributed ledger-based software functions, each of the client servers 3A to 3D functions as a node. Although the client server 3A belonging to the company A will be representatively described below, the client servers 3B to 3D belonging to the other companies B to D have the same configurations and functions as the client server 3A. Each of the client servers 3A to 3D corresponds to the "data management device" according to the present disclosure.

The client server 3A is communicably connected to a Time Stamp Authority 41A, user equipment 42A, and a database 43A.

The Time Stamp Authority 41A issues a time stamp token in response to a time stamp issue request from the client server 3A that is an applicant. A time stamp token is a file received from an applicant (in the first embodiment, a record hash value that will be described later) combined with time information based on a time source that is traceable to the international standard time. The Time Stamp Authority 41A is preferably a public certificate authority that can issue public certificates. A Time Stamp Authority may be common to part or all of the client servers 3A to 3D.

The user equipment 42A is an information processing terminal lent to a user (e.g., an employee of the company A), such as a personal computer (PC), a smartphone, or a tablet. The user equipment 42A functions as an input device 34 and/or an output device 35 of the client server 3A (see FIG. 2).

The database 43A is a rewritable storage device such as a hard disk drive (HDD) or a solid state drive (SSD). When the user performs on the input device 34 of the client server 3A (see FIG. 2) or the user equipment 42A an operation to request registration and/or update of a file or time of confirmation, the client server 3A outputs a control signal to the database 43A in response to the operation. The database 43A stores (registers and/or updates) the file or the time of confirmation according to the control signal from the client server 3A. The database(s) may be shared between or among part of all of the client servers 3A to 3D.

Figure 2:
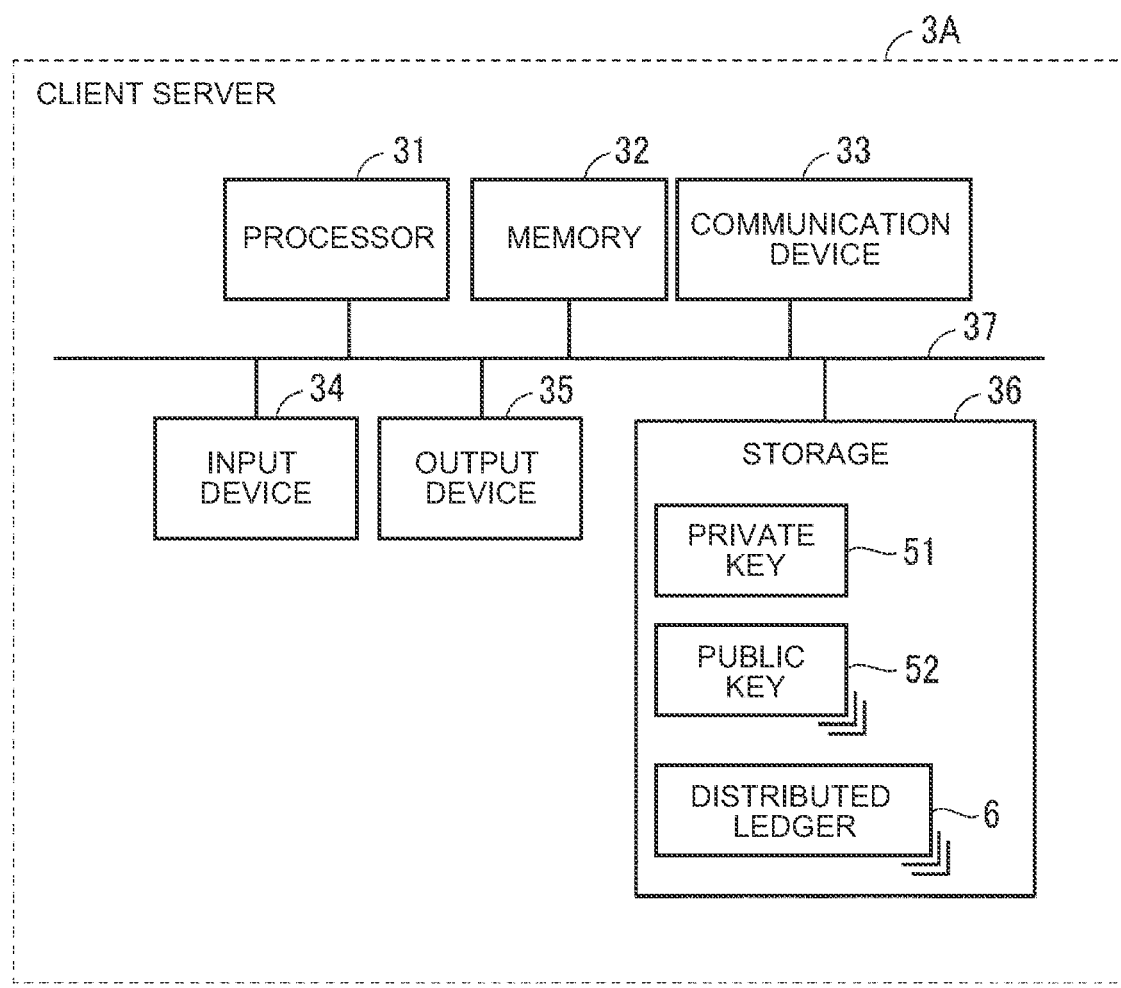
FIG. 2 shows an example of the configuration of a client server.

FIG. 2 shows an example of the configuration of the client server 3A. Referring to FIGS. 1 and 2, the client server 3A includes a processor 31, a memory 32, a communication device 33, the input device 34, the output device 35, and a storage 36. The components of the client server 3A are communicably connected to each other by a bus 37.

The processor 31 is an arithmetic processing unit such as a central processing unit (CPU) or a micro-processing unit (MPU). The memory 32 includes a read-only memory (ROM) and a random access memory (RAM). The memory 32 stores system programs including an operating system (OS) and control programs including computer-readable codes necessary to perform control calculations. The processor 31 implements various processes by reading the system programs and the control programs, loading them into the memory 32, and executing them. As will be described in detail later, the processor 31 is configured to store files or times of confirmation in the database 43A, acquire time stamp tokens from the Time Stamp Authority 41A, and generate transaction data for updating a distributed ledger.

Although FIG. 2 shows an example in which the client server 3A includes only one processor, the client server 3A may include a plurality of processors. That is, the client server 3A includes one or more processors. The same applies to the memory 32 and the storage 36. In the present specification, the "processor" is not limited to a narrowly defined processor that executes processes by a stored program method, and may include hardwired circuitry such as an application specific integrated circuit (ASIC) and a field-programmable gate array (FPGA). Therefore, the term "processor" may be used interchangeably with processing circuitry that executes processes defined in advance by computer-readable codes and/or hardwired circuitry.

The communication device 33 communicates with external devices of the client server 3A. The external devices include the platform server 2, the other client servers 3B to 3D, the Time Stamp Authority 41A, the user equipment 42A, and the database 43A.

The input device 34 is a device configured to receive operations performed by the user, such as a mouse, a keyboard, or a touch panel. The output device 35 is a device configured to provide information to the user, and is typically a display.

The storage 36 is a rewritable storage device such as an HDD, an SSD, or a flash memory. The storage 36 stores a private key 51, a plurality of public keys 52, and a distributed ledger 6.

The private key 51 is a private key managed by the company A. The public keys 52 include public keys of the companies B to D. The public keys 52 may include the company A's own public key. For example, when the client server 3A first joins the network NW, the processor 31 generates a private key and a public key. The processor 31 sends the generated public key to a certificate authority (not shown) to get it certified. The certificate authority issues an electronic certificate including information on the public key. The processor 31 stores the private key 51 corresponding to the certified public key in the storage 36. The processor 31 sends the certified public key (electronic certificate) 52 to the client servers 3B to 3D of the other companies B to D. Each of the client servers 3B to 3D also sends its own public key to the other client servers.

The distributed ledger 6 includes a plurality of ledgers. Since each ledger has a chain structure (more specifically, a directed acyclic graph (DAG) structure), each ledger will be hereinafter sometimes referred to as "chain." In the first embodiment, two types of chains, which will be described later, are prepared for each predetermined target (e.g., each vehicle, each vehicle part, each control program, and each specification document). When the client server 3A stores a file and/or a time of confirmation in the database 43A, the client server 3A stores information on the file and/or the time of confirmation in the two types of chains.

Hereinafter, the client servers 3A to 3D will be simply referred to as "client servers 3" with no letters A to D at the end when they are not particularly distinguished. The same applies to the Time Stamp Authorities, the pieces of user equipment, and the databases.

Distributed Ledger

Figure 3:
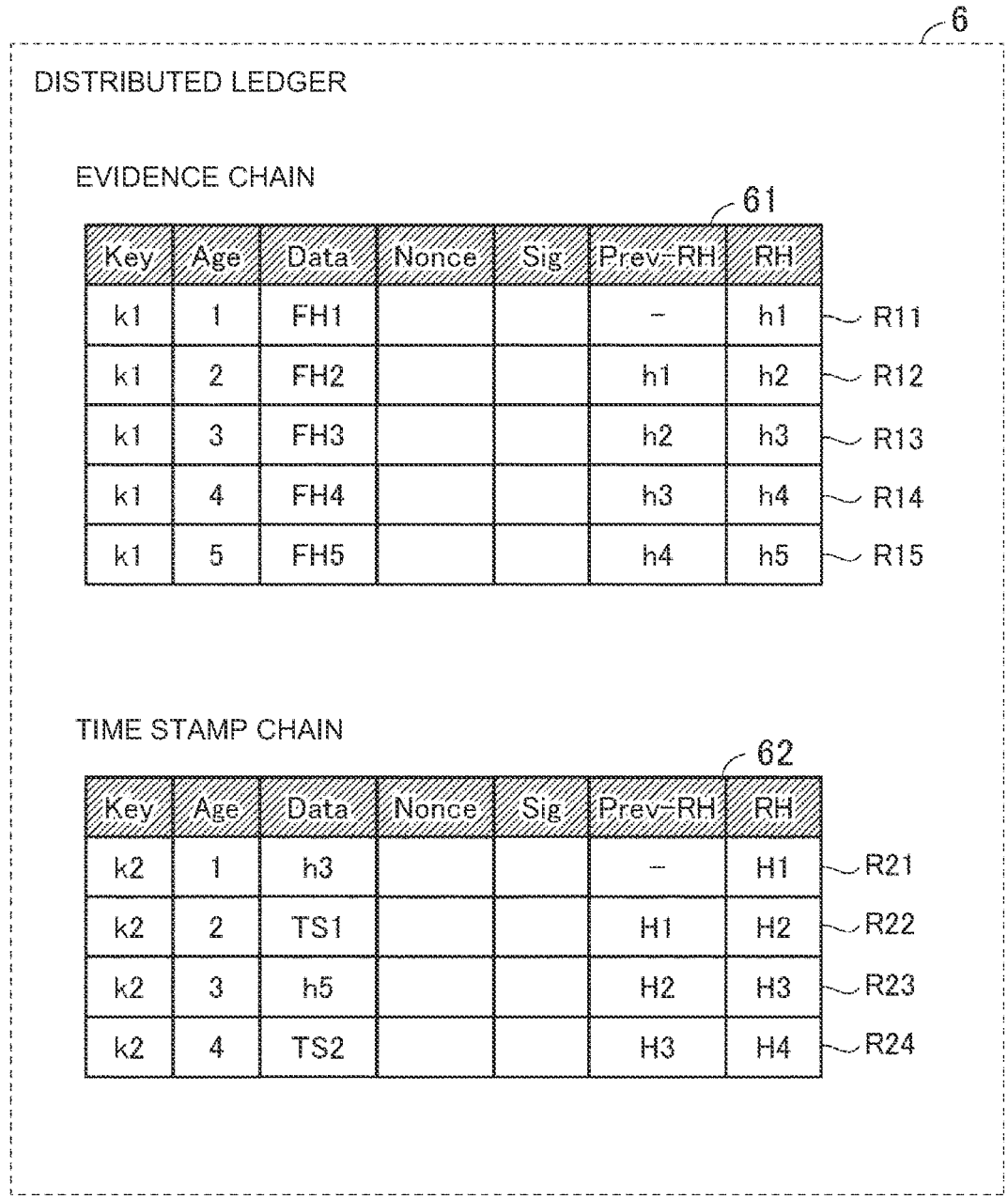
FIG. 3 shows an example of the data structure of a distributed ledger.

FIG. 3 shows an example of the data structure of the distributed ledger 6. The distributed ledger 6 includes, for example, a plurality of evidence chains 61 and a plurality of time stamp chains 62. Due to space limitations, FIG. 3 shows two types of chains, one for each type of chain. In the first embodiment, one evidence chain 61 and one time stamp chain 62 are associated with each other. However, as will be described later in a second embodiment, a plurality of evidence chains 61 may be associated with one time stamp chain 62.

The evidence chain 61 is a ledger in which records related to a file are stored in chronological order. In the example shown in FIG. 3, the evidence chain 61 includes five records R11 to R15. Each record includes a key (Key), a generation (Age), data (Data), a nonce value (Nonce), an electronic signature (Sig), a previous record hash value (Prev-RH), and a record hash value (RH).

The key is identification information (ID) identifying the evidence chain 61. Identification information of the target (vehicle, vehicle part, control program, specification document, etc.) may be used as the key. In this example, Key=k1 is assigned to the evidence chain 61. Records with Key=k1 are therefore stored in the evidence chain 61.

The generation is information indicating the order of the records. The generation of the first record is 1. The generation is incremented each time the file and/or the time of confirmation is updated and a record is added. Hereinafter, the first (oldest) record will also be referred to as "starting record." The last (most recent) record will also be referred to as "terminal record."

The data in the evidence chain 61 is hash values (hereinafter also referred to as "file hash values") generated from the file. When the file is updated, a hash value is generated by hashing the updated file using a hash function. The generated hash value is stored as a file hash value. In this example, file hash values FH1 to FH5 are stored in the five records R11 to R15, respectively. The file hash value corresponds to the "hash value" according to the present disclosure.

The nonce value is a value indicating the number of transaction data. For example, the nonce value is used as the number of the process for storing a file hash value in the evidence chain 61 when the file is updated.

The electronic signature is information verifying the identity of the client server 3 that issued transaction data. For example, the electronic signature is created by encrypting a file hash value with the private key 51 of the client server 3 that issued the transaction data.

The previous record hash value is the record hash value of the record of one generation before a subject record (in other words, the parent record).

The record hash value is the hash value of the subject record. The record hash value is generated by hashing information on the record other than the record hash value (such as Key, Age, Data, Nonce, Sig, and Prev-RH) using a hash function.

The record hash value of the terminal record (record with Age=5) R15 in the evidence chain 61 is "h5." The previous record hash value of the terminal record R15 is the record hash value "h4" of its parent record (record with Age=4) R14. The previous record hash value of the record R14 is the record hash value "h3" of its parent record (record with Age=3) R13. As described above, as each of the records in the evidence chain 61 includes the record hash value of its parent record (previous record hash value), the records are chained together in the evidence chain 61.

The time stamp chain 62 is a ledger in which records related to times of confirmation are stored in chronological order. In the example shown in FIG. 3, the time stamp chain 62 includes four records R21 to R24. Like the records in the evidence chain 61, each record includes a key (Key), a generation (Age), data (Data), a nonce value (Nonce), an electronic signature (Sig), a previous record hash value (Prev-RH), and a record hash value (RH).

The data in the evidence chain 61 is file hash values, whereas the data in the time stamp chain 62 is time stamp tokens or terminal hash values (End-RH). As will be described in detail later, a time stamp token for a terminal hash value in the evidence chain 61 is acquired from the Time Stamp Authority 41 in response to a user operation requesting acquisition of a time stamp token. In this example, time stamp tokens TS1, TS2 are stored in the two records R22, R24, respectively.

A terminal hash value is the record hash value of the terminal record in the evidence chain 61 at the time a user operation requesting acquisition of a time stamp token is performed. In this example, the record hash value "h3" of the record R13 in the evidence chain 61 is stored in the record R21 as a terminal hash value. The record hash value "h5" of the record R15 in the evidence chain 61 is stored in the record R23 as a terminal hash value.

Since information other than the above included in the time stamp chain 62 is similar to the corresponding information in the evidence chain 61, detailed description thereof will not be repeated.

Figure 4:
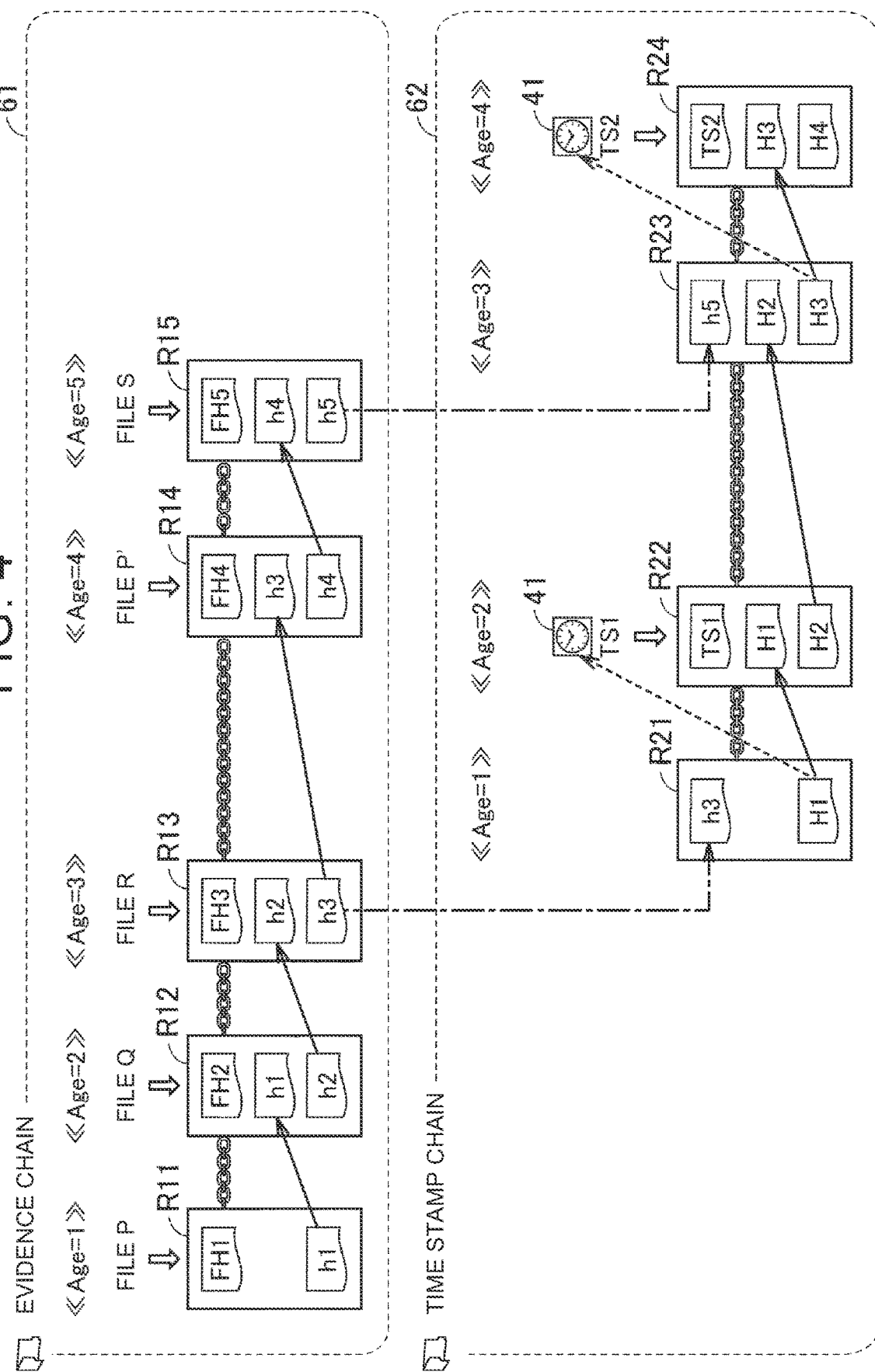
FIG. 4 is a conceptual diagram illustrating the relationship between records stored in an evidence chain and a time stamp chain.

FIG. 4 is a conceptual diagram illustrating the relationship between the records stored in the evidence chain 61 and the time stamp chain 62. Hereinafter, description will be given in chronological order with reference to both FIGS. 3 and 4.

Age=1 in Evidence Chain

First, a file P is registered in the database 43A according to a user operation. The client server 3A generates transaction data for adding the record R11 of the first generation (Age=1) to the evidence chain 61. The record R11 includes the file hash value FH1 generated by hashing the file P and a record hash value h1.

The client server 3A sends the generated transaction data to the network NW. A process for executing the transaction data (transaction process) is executed in the client servers 3A to 3D, whereby the record R11 is added to the evidence chains 61 in the client servers 3A to 3D. Since these processes are the same for the subsequent generations, description thereof will not be repeated.

Age=2 in Evidence Chain

When a file Q is registered in the database 43A according to a user operation, the client server 3A generates transaction data for adding the record R12 of the second generation (Age=2) to the evidence chain 61. The record R12 includes the file hash value FH2 for the file Q, the previous record hash value h1, and the record hash value h2.

Age=3 in Evidence Chain

When a file R is registered in the database 43A according to a user operation, the client server 3A generates transaction data for adding the record R13 of the third generation (Age=3) to the evidence chain 61. The record R13 includes the file hash value FH3 for the file R, the previous record hash value h2, and the record hash value h3.

Age=1 in Time Stamp Chain

It is herein assumed that, at the time the record R13 is the terminal record in the evidence chain 61, the user performs on the input device 34 (or the user equipment 42A) an operation to add a time of confirmation to the record R13. In response to the user operation, the client server 3A generates transaction data for adding the record R21 of the first generation (Age=1) to the time stamp chain 62. The record R21 includes the terminal hash value (record hash value of the record R13 that is the terminal record in the evidence chain 61) h3 and a record hash value H1.

Age=2 in Time Stamp Chain

The client server 3A acquires the time stamp token TS1 for the record hash value (previous record hash value) H1 of the parent record R21 from the Time Stamp Authority 41A. The client server 3A generates transaction data for adding the record R22 of the second generation (Age=2) to the time stamp chain 62. The record R22 includes the time stamp token TS1, the previous record hash value H1, and a record hash value H2.

Age=4 in Evidence Chain

When the file P is updated to a file P' according to a user operation, the client server 3A generates transaction data for adding the record R14 of the fourth generation (Age=4) to the evidence chain 61. The record R14 includes the file hash value FH4 for the updated file P', the previous record hash value h3, and the record hash value h4.

Age=5 in Evidence Chain

When a file S is registered in the database 43A according to a user operation, the client server 3A generates transaction data for adding the record R15 of the fifth generation (Age=5) to the evidence chain 61. The record R15 includes the file hash value FH5 for the file S, the previous record hash value h4, and the record hash value h5.

Age=3 in Time Stamp Chain

It is herein assumed that, at the time the record R15 is the terminal record in the evidence chain 61, the user performs on the input device 34 (or the user equipment 42A) an operation to add a time of confirmation to the record R15. In response to the user operation, the client server 3A generates transaction data for adding the record R23 of the third generation (Age=3) to the time stamp chain 62. The record R23 includes the terminal hash value (record hash value of the record R15 that is the terminal record in the evidence chain 61) h5, the previous record hash value H2, and a record hash value H3.

Age=4 in Time Stamp Chain

The client server 3A acquires the time stamp token TS2 for the previous record hash value H3 from the Time Stamp Authority 41A. The client server 3A generates transaction data for adding the record R24 of the fourth generation (Age=4) to the time stamp chain 62. The record R24 includes the time stamp token TS2, the previous record hash value H3, and a record hash value H4.

In the present embodiment, in both the evidence chain 61 and the time stamp chain 62, each of the records (except the starting record) includes a previous record hash value. All of the records are therefore chained together in both the evidence chain 61 and the time stamp chain 62. Therefore, in order to tamper with any of the records (particularly the file hash value or time stamp token in that record), it is necessary to tamper with all of the records added after that record. However, such tampering is difficult in reality. According to the present embodiment, it is therefore possible to prove that the files have not been tampered with (file integrity), and it is also possible to prove that the times of confirmation have not been tampered with (confirmation-time integrity). The term "tampering" as used herein includes "corruption" or "deletion" of a file and a time of confirmation (time stamp token).

Since all of the records are chained together in the evidence chain 61, the order of all the records stored in the evidence chain 61 is uniquely identified. According to the present embodiment, it is therefore possible to prove the temporal order of a plurality of files (file ordering).

In addition, in the present embodiment, a time stamp token is acquired for the record hash value of the record in the time stamp chain 62 that includes a terminal hash value in the evidence chain 61. It is therefore possible to prove which files existed and which files did not at the time of confirmation certified by the time stamp token. In the example shown in FIGS. 3 and 4, the time stamp token TS1 is acquired for the record hash value H1 of the record R21 including the terminal hash value h3 of the record R13. It is therefore possible to prove that the file R (and the preceding files P, Q) existed at the time of confirmation certified by the time stamp token TS1, and that the subsequent files P', S did not exist at the time of confirmation certified by the time stamp token TS1 (in other words, the files P', S were registered or updated after the time of confirmation certified by the time stamp token TS1). The time stamp token TS2 is also acquired for the record hash value H3 of the record R23 including the terminal hash value h5 of the record R15. It is therefore possible to prove that the file S (and the preceding files P, Q, R, and P') existed at the time of confirmation certified by the time stamp token TS2.

Functional Blocks

Figure 5:
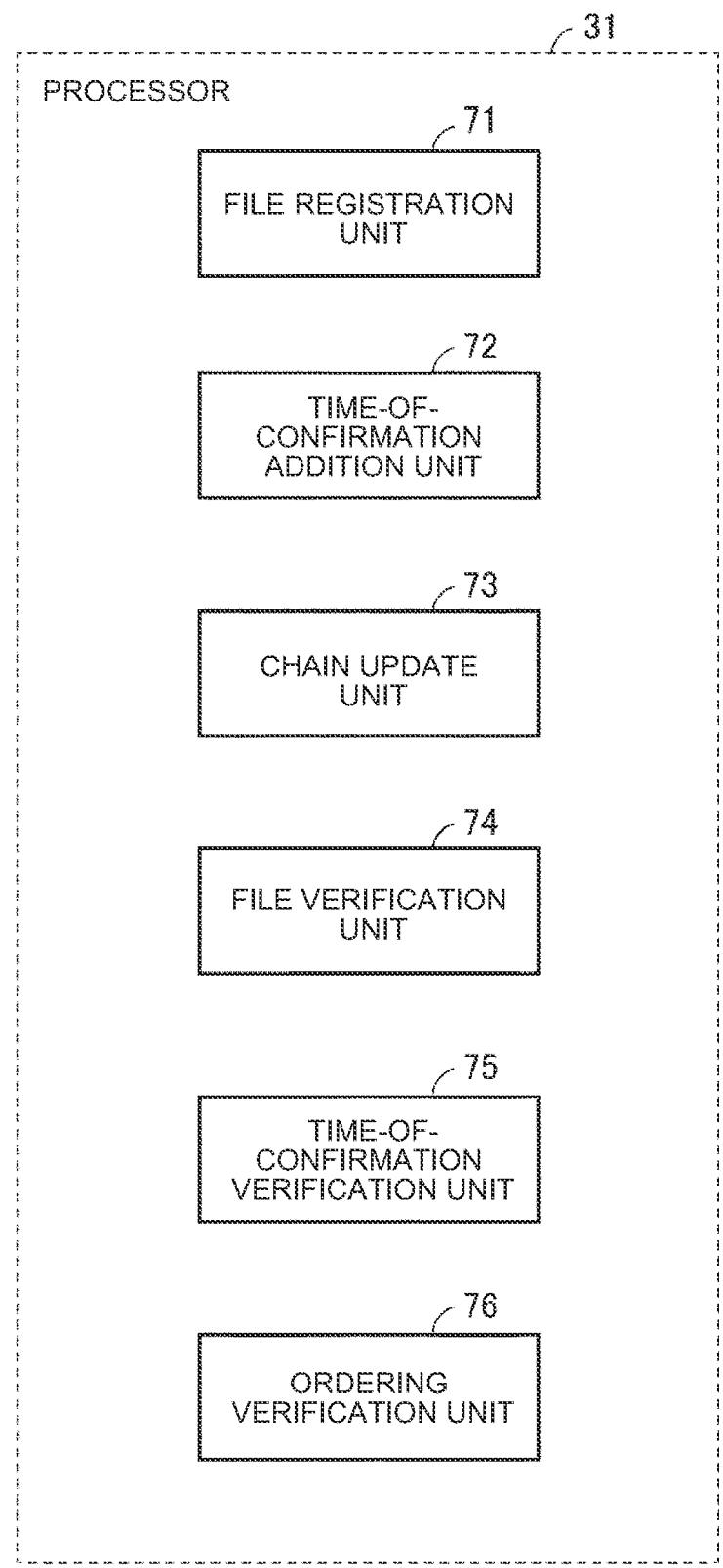
FIG. 5 is a functional block diagram regarding main functions of a processor of the client server.

FIG. 5 is a functional block diagram regarding main functions of the processor 31 of the client server 3. The processor 31 includes a file registration unit 71, a time-of-confirmation addition unit 72, a chain update unit 73, a file verification unit 74, a time-of-confirmation verification unit 75, and an ordering verification unit 76. Each functional block is implemented by the processor 31 executing the programs stored in the memory 32. Each functional block may be implemented by dedicated hardware (electronic circuitry). Hereinafter, these functional blocks will be sequentially described.

File Registration

Figure 6:
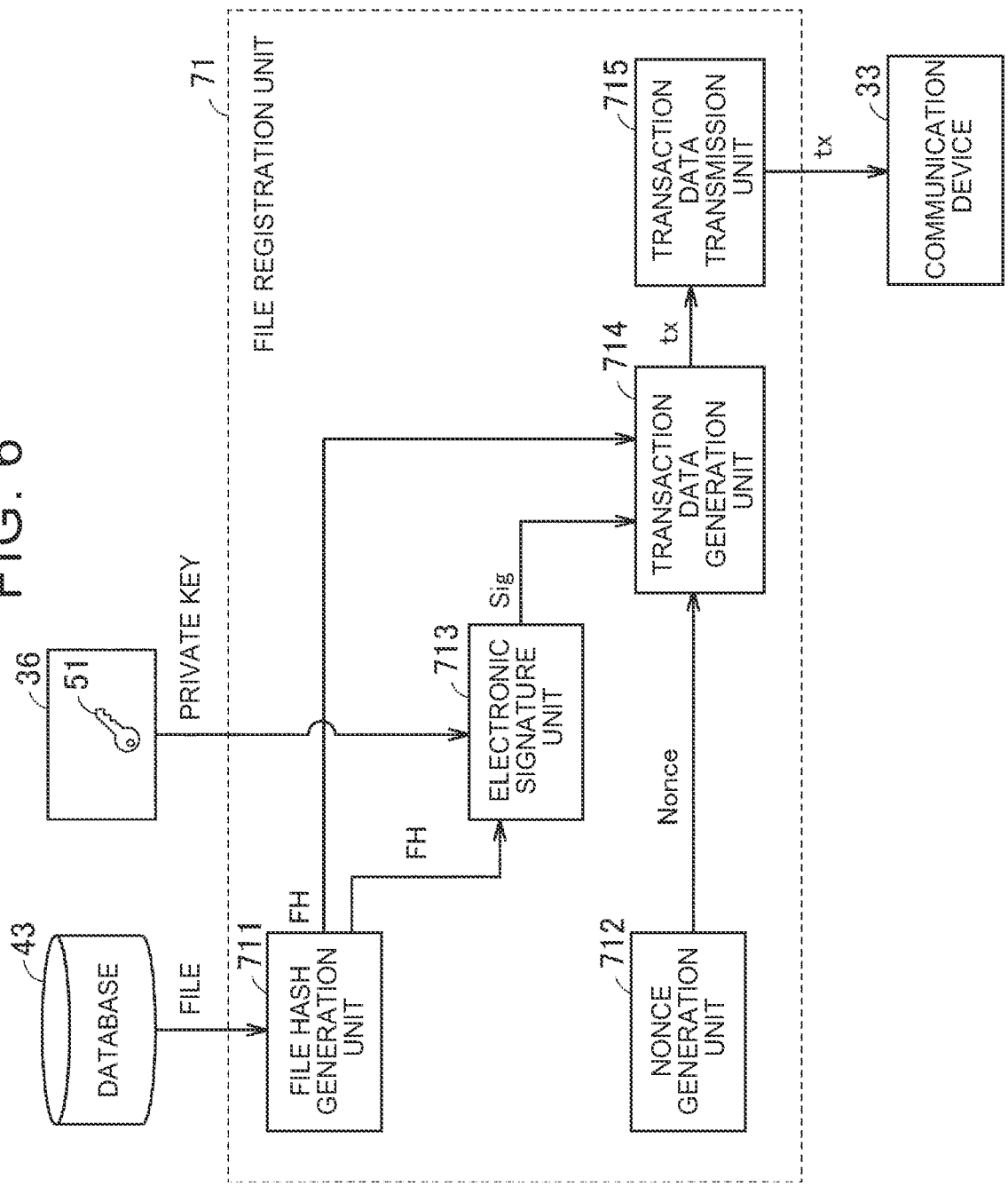
FIG. 6 is a functional block diagram of a file registration unit.

FIG. 6 is a functional block diagram of the file registration unit 71. The file registration unit 71 generates transaction data for adding a record including a file hash value to the evidence chain 61, according to a user operation to register (or update) a file in the database 43. The file registration unit 71 includes a file hash generation unit 711, a nonce generation unit 712, an electronic signature unit 713, a transaction data generation unit 714, and a transaction data transmission unit 715.

A request is generated according to a user operation performed on the input device 34 or the user equipment 42. This request includes a key that is an identifier (ID) identifying the evidence chain 61 to which a record is to be added. Although not shown in the figure, each functional block receives the key from the preceding block and outputs the key to the subsequent block. The process is thus executed on the evidence chain 61 identified by the key.

The file hash generation unit 711 reads the file from the database 43 in response to the request. The file hash generation unit 711 generates a file hash value (FH) by hashing the file using a hash function. The file hash generation unit 711 outputs the file hash value to the electronic signature unit 713 and the transaction data generation unit 714.

The nonce generation unit 712 generates a nonce value (Nonce) in response to the request. The nonce generation unit 712 outputs the nonce value to the transaction data generation unit 714. Although not shown in the figure, when a nonce value is used to create an electronic signature, the nonce generation unit 712 may output the nonce value to the electronic signature unit 713.

The electronic signature unit 713 reads the private key 51 from the storage 36. The electronic signature unit 713 creates an electronic signature (Sig) by encrypting the file hash value from the file hash generation unit 711 with the private key 51. The electronic signature unit 713 may create an electronic signature by encrypting the nonce value from the nonce generation unit 712 with the private key 51. The electronic signature unit 713 may create an electronic signature by encrypting the file hash value and the nonce value with the private key 51. The electronic signature unit 713 outputs the electronic signature to the transaction data generation unit 714.

The transaction data generation unit 714 calculates the generation of a record to be newly added to the evidence chain 61. In this example, the transaction data generation unit 714 acquires the generation of the terminal record (that is, the parent record) in the evidence chain 61 by inquiring the evidence chain 61 for the key. Alternatively, the transaction data generation unit 714 acquires the generation of the terminal record in the time stamp chain 62 associated with the evidence chain 61. The transaction data generation unit 714 then calculates the generation of the record to be newly added by incrementing the generation of the acquired terminal record by one.

The transaction data generation unit 714 acquires the record hash value of the parent record in the evidence chain 61 as a previous record hash value (Prev-RH) (not shown). The transaction data generation unit 714 calculates a record hash value (RH) by hashing the key, generation, file hash value, nonce value, electronic signature, and previous record hash value. The transaction data generation unit 714 then generates transaction data (tx) including the key, generation, file hash value, nonce value, electronic signature, previous record hash value, and record hash value. It is desirable that the transaction data further include sender information identifying the client server 3 that is the source of the transaction data. The transaction data generation unit 714 may include, in the transaction data, time information at which the transaction data is to be broadcast to the network NW. The transaction data generation unit 714 outputs the transaction data to the transaction data transmission unit 715.

The transaction data transmission unit 715 outputs to the communication device 33 a control signal for transmitting the transaction data. The transaction data is thus broadcast to the network NW via the communication device 33.

Acquisition of Time of Confirmation

Figure 7:
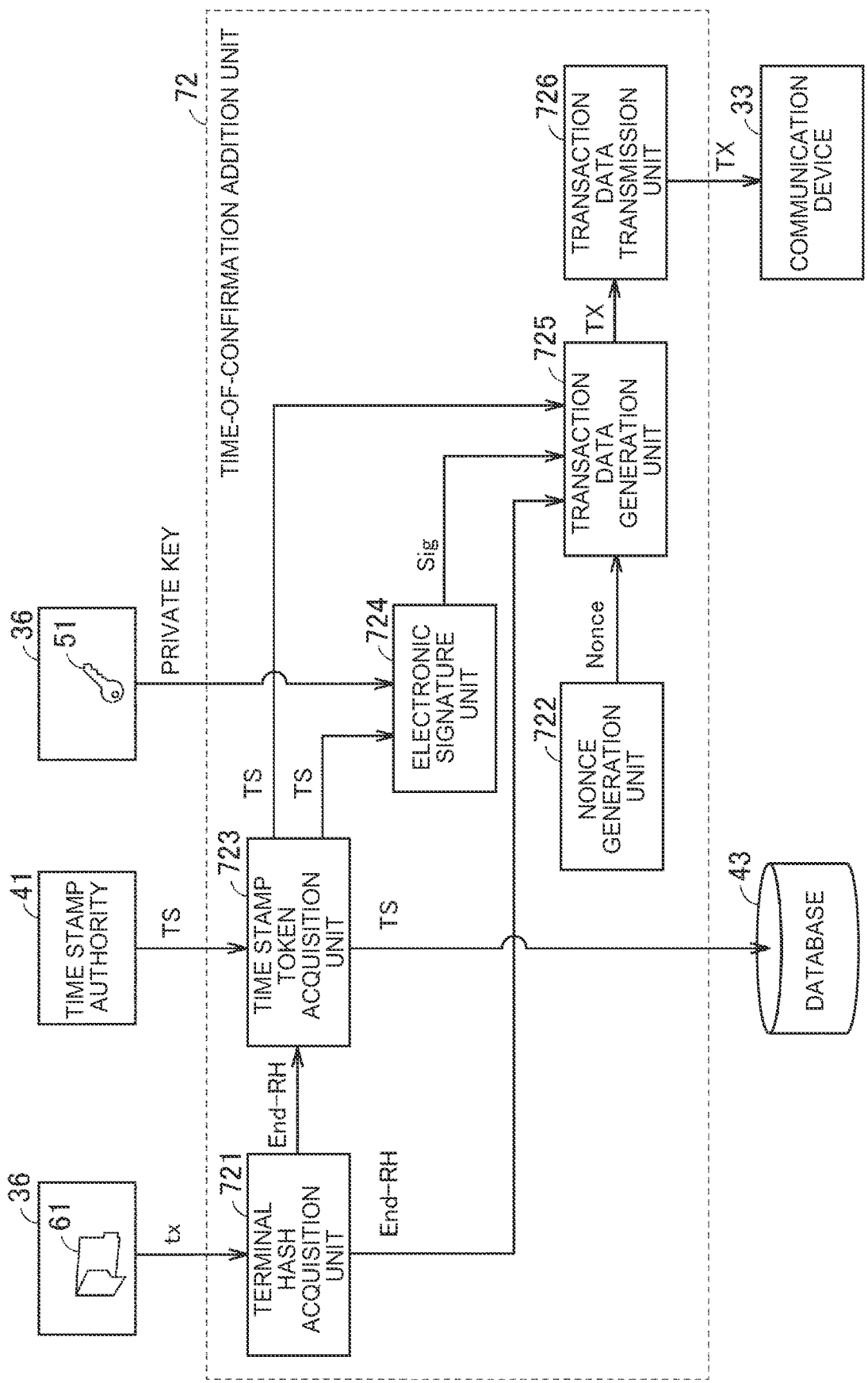
FIG. 7 is a functional block diagram of a time-of-confirmation addition unit.

FIG. 7 is a functional block diagram of the time-of-confirmation addition unit 72. The time-of-confirmation addition unit 72 stores a time of confirmation in the database 43 according to a user operation. The time-of-confirmation addition unit 72 also generates transaction data for adding a record including a time stamp token to the time stamp chain 62 according to this user operation. The time-of-confirmation addition unit 72 includes a terminal hash acquisition unit 721, a nonce generation unit 722, a time stamp token acquisition unit 723, an electronic signature unit 724, a transaction data generation unit 725, and a transaction data transmission unit 726.

A request is generated according to a user operation performed on the input device 34 or the user equipment 42. This request includes a first key and a second key. The first key is an ID identifying the evidence chain 61 to which a time of confirmation is to be added, and the second key is an ID identifying the time stamp chain 62 to which a record is to be added. Each functional block executes a process on the evidence chain 61 identified by the first key and the time stamp chain 62 identified by the second key.

In response to the request, the terminal hash acquisition unit 721 extracts transaction data corresponding to the terminal record in the evidence chain 61. The terminal hash acquisition unit 721 acquires the terminal hash value (record hash value of the terminal record) (End-RH) of the evidence chain 61 from the extracted transaction data. The terminal hash acquisition unit 721 outputs the acquired terminal hash value to the time stamp token acquisition unit 723 and the transaction data generation unit 725.

The nonce generation unit 722 generates a nonce value (Nonce) in response to the request. The nonce generation unit 722 outputs the nonce value to the transaction data generation unit 725. Although not shown in the figure, when a nonce value is used to create an electronic signature, the nonce generation unit 722 may output the nonce value to the electronic signature unit 724.

The time stamp token acquisition unit 723 acquires a time stamp token (TS) for the terminal hash value received from the terminal hash acquisition unit 721. More specifically, the time stamp token acquisition unit 723 sends the terminal hash value to the Time Stamp Authority 41 via the communication device 33. The Time Stamp Authority 41 sends a time stamp token back to the client server 3 that is the source of the terminal hash value. The time stamp token is thus acquired. The time stamp token acquisition unit 723 stores the time stamp token in the database 43 (or the storage 36) as a time of confirmation. Te time stamp token acquisition unit 723 also outputs the time stamp token to the electronic signature unit 724 and the transaction data generation unit 725.

The electronic signature unit 724 reads the private key 51 from the storage 36. The electronic signature unit 724 creates an electronic signature (Sig) by encrypting the time stamp token from the time stamp token acquisition unit 723 with the private key 51. The electronic signature unit 724 may create an electronic signature by encrypting the nonce value from the nonce generation unit 722 with the private key 51. The electronic signature unit 724 may create an electronic signature by encrypting the time stamp token and the nonce value with the private key 51. The electronic signature unit 724 outputs the electronic signature to the transaction data generation unit 725.

The transaction data generation unit 725 calculates the generation of a record to be newly added to the time stamp chain 62. Since this calculation is performed by the same calculation method as that performed by the transaction data generation unit 714 (see FIG. 6), description thereof will not be repeated.

The transaction data generation unit 725 acquires the record hash value of the parent record in the time stamp chain 62 as a previous record hash value (Prev-RH) (not shown). The transaction data generation unit 725 calculates a record hash value (RH) by hashing the key, generation, data (terminal hash value or time stamp token), nonce value, electronic signature, and previous record hash value. The transaction data generation unit 725 then generates transaction data (TX) including the key, generation, time stamp token, nonce value, electronic signature, terminal hash value, previous record hash value, and record hash value. It is desirable that the transaction data further include sender information. The transaction data generation unit 725 outputs the transaction data to the transaction data transmission unit 726.

The transaction data transmission unit 726 outputs to the communication device 33 a control signal for transmitting the transaction data. The transaction data is thus broadcast to the network NW via the communication device 33.

Chain Update

Figure 8:
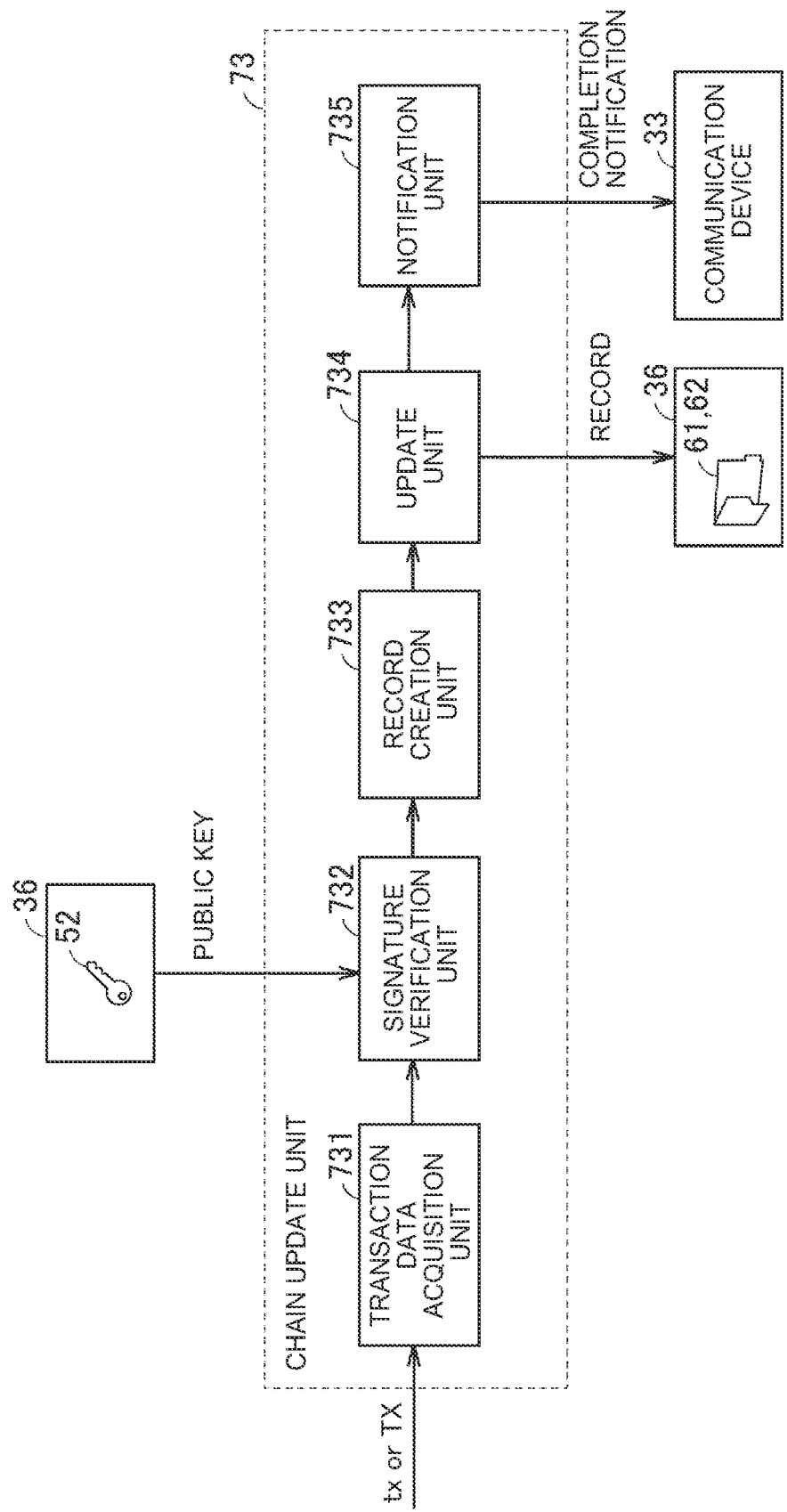
FIG. 8 is a functional block diagram of a chain update unit.

FIG. 8 is a functional block diagram of the chain update unit 73. The chain update unit 73 updates the evidence chain 61 or the time stamp chain 62 by adding a new record to the evidence chain 61 or the time stamp chain 62 through a transaction process. Although the example given below is for the evidence chain 61, the same applies to the time stamp chain 62 in the first embodiment. The chain update unit 73 includes a transaction data acquisition unit 731, a signature verification unit 732, a record creation unit 733, an update unit 734, and a notification unit 735.

The transaction data acquisition unit 731 acquires transaction data (tx) from the network NW. The transaction data acquisition unit 731 outputs the transaction data to the signature verification unit 732.

The signature verification unit 732 verifies the validity of the electronic signature included in the transaction data. As described above, an electronic signature is a file hash value encrypted with the private key 51 of the source client server 3. The signature verification unit 732 first identifies the client server 3 that is the source of the transaction data, based on the sender information included in the transaction data. The signature verification unit 732 then reads from the storage 36 the public key of the identified client server 3 out of the plurality of public keys 52. The signature verification unit 732 decrypts the electronic signature included in the transaction data with the public key. The signature verification unit 732 compares the decrypted value with the file hash value included in the transaction data. When the decrypted value matches the file hash value included in the transaction data, the signature verification unit 732 recognizes the validity of the electronic signature and outputs the verification result to the record creation unit 733.

When the validity of the electronic signature is recognized, the record creation unit 733 creates a record to be added to the evidence chain 61 based on the transaction data. More specifically, the record creation unit 733 acquires a key, generation, file hash value, nonce value, electronic signature, previous record hash value, and record hash value from the transaction data, and creates a record including these pieces of information. The record creation unit 733 outputs the record to the update unit 734.

The update unit 734 updates the evidence chain 61. More specifically, the update unit 734 refers to the key of the record received from the record creation unit 733 and identifies the evidence chain 61 to which the record is to be added. The update unit 734 then adds the record to the identified evidence chain 61. When the update of the evidence chain 61 is completed, the update unit 734 outputs a completion notification to the notification unit 735.

The notification unit 735 outputs to the communication device 33 a control signal for notifying of completion of the transaction process. The client server 3 that is the source of the transaction data is thus notified of the completion of the transaction process.

File Integrity Verification

Figure 9:
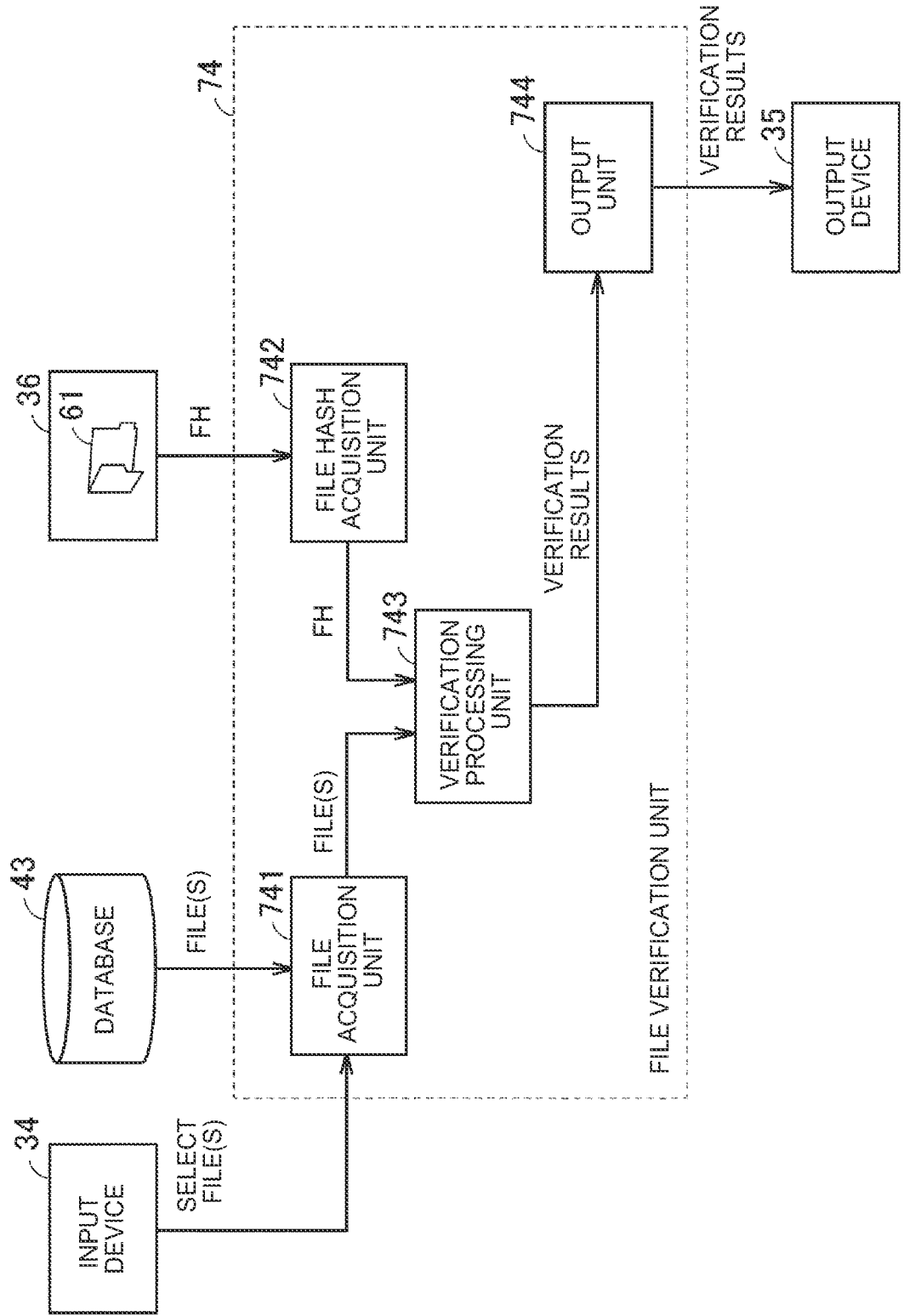
FIG. 9 is a functional block diagram of a file verification unit.

FIG. 9 is a functional block diagram of the file verification unit 74. The file verification unit 74 verifies the integrity of a file whose record is stored in the evidence chain 61 (verifies that the file has not been tampered with). An object to be verified may be all the files in the evidence chain 61 or part of the files selected by the user. The file verification unit 74 includes a file acquisition unit 741, a file hash acquisition unit 742, a verification processing unit 743, and an output unit 744.

The file acquisition unit 741 receives from the input device 34 (or the user equipment 42) a user operation to select a file(s) to be verified. For example, the user first identifies the evidence chain 61. The user may then identify all of a plurality of files whose records are stored in that evidence chain 61 as an object to be verified. Alternatively, the user may identify part of the files as an object to be verified. The file(s) to be verified is (are) thus selected. The file acquisition unit 741 acquires cach selected file from the database 43 and outputs each acquired file to the verification processing unit 743.

For each file selected by the user, the file hash acquisition unit 742 acquires its corresponding file hash value (FH) stored in the evidence chain 61 in the storage 36. The file hash acquisition unit 742 outputs the file hash value to the verification processing unit 743.

The verification processing unit 743 determines whether the file received from the file acquisition unit 741 has been tampered with, based on whether this file matches the file hash value received from the file hash acquisition unit 742.

More specifically, the verification processing unit 743 hashes each file received from the file acquisition unit 741 using a hash function. For each file, the verification processing unit 743 then compares a file hash value obtained by the hashing with the corresponding file hash value received from the file hash acquisition unit 742. When the two file hash values of a certain file match, the verification processing unit 743 determines that the file has not been tampered with (no tampering detected). When the two file hash values of another file does not match, the verification processing unit 743 determines that the file may have been tampered with (tampering detected). The verification processing unit 743 outputs the verification results ("tampering detected" or "no tampering detected" for each file, which file has been tampered with, etc.) to the output unit 744.

The output unit 744 outputs the verification results received from the verification processing unit 743 to the output device 35 (or the user equipment 42). This allows the user to check the verification results for one or more files selected by the user.

Time-of-Confirmation Integrity Verification

Figure 10:
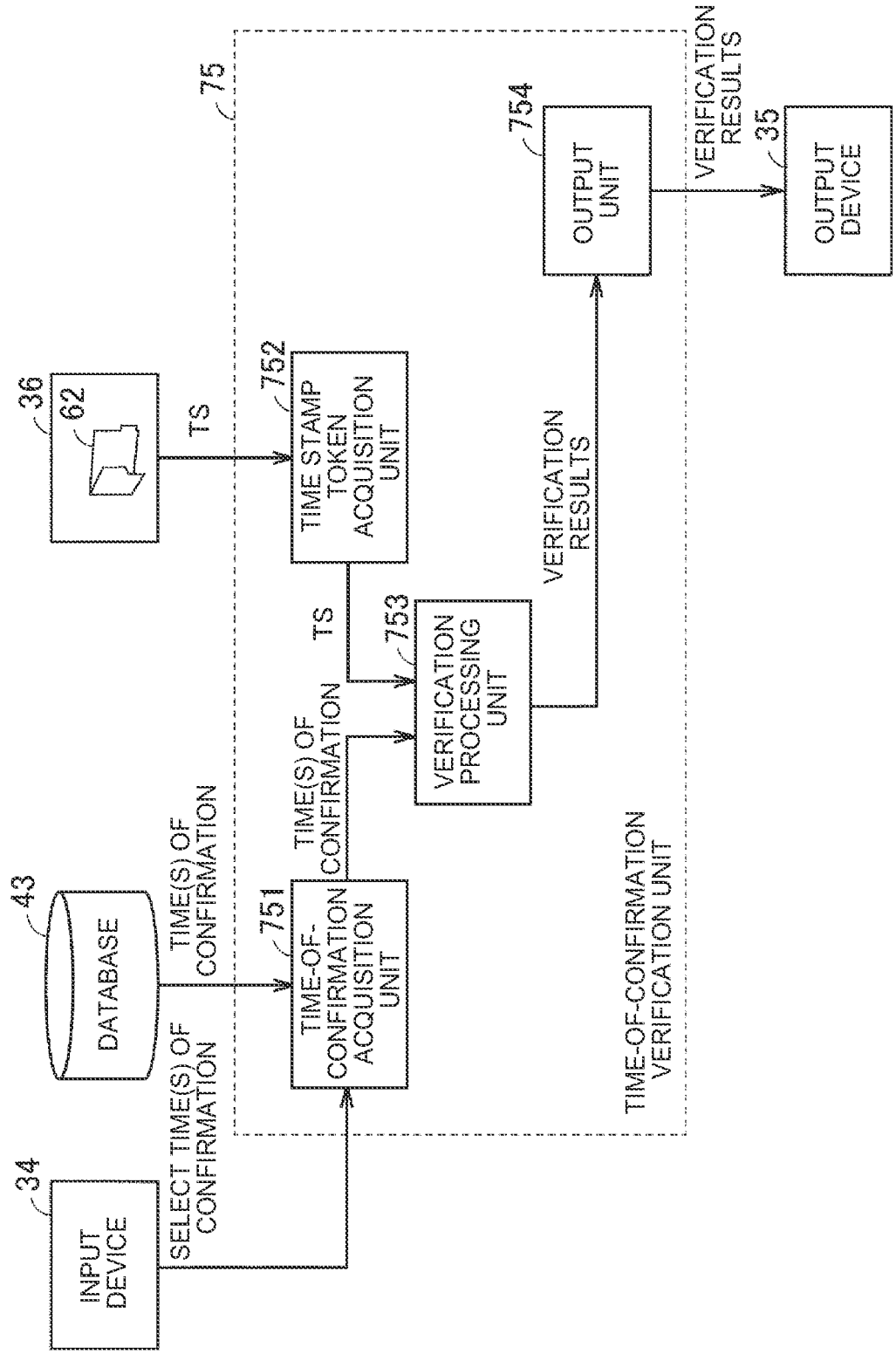
FIG. 10 is a functional block diagram of a time-of-confirmation verification unit.

FIG. 10 is a functional block diagram of the time-of-confirmation verification unit 75. The time-of-confirmation verification unit 75 verifies the integrity of the time of confirmation certified by a time stamp token (verifies that the time of confirmation has not been tampered with). An object to be verified may be all the times of confirmation in the time stamp chain 62 or part of the times of confirmation that is selected by the user. The time-of-confirmation verification unit 75 includes a time-of-confirmation acquisition unit 751, a time stamp token acquisition unit 752, a verification processing unit 753, and an output unit 754.

The time-of-confirmation acquisition unit 751 receives from the input device 34 (or the user equipment 42) a user operation to select a time of confirmation to be verified. For example, the user first identifies the time stamp chain 62. The user may then identify all of a plurality of times of confirmation included in that time stamp chain 62 as an object to be verified. Alternatively, the user may identify part of the times of confirmation as an object to be verified. The time(s) of confirmation to be verified is (are) thus selected. As will be described later, the time(s) of confirmation to be verified may be automatically selected according to a user operation to select a file(s). The time-of-confirmation acquisition unit 751 acquires each selected time of confirmation from the database 43 and outputs each acquired time of confirmation to the verification processing unit 753.

For each time of confirmation selected by the user, the time stamp token acquisition unit 752 acquires its corresponding time stamp token (TS) stored in the time stamp chain 62 in the storage 36. The time stamp token acquisition unit 752 outputs the time stamp token to the verification processing unit 753.

The verification processing unit 753 determines whether the time of confirmation received from the time-of-confirmation acquisition unit 751 (database 43) has been tampered with, based on whether this time of confirmation matches the time stamp token received from the time stamp token acquisition unit 752 (time stamp chain 62), More specifically, the verification processing unit 753 compares each time of confirmation received from the time-of-confirmation acquisition unit 751 with its corresponding time stamp token received from the time stamp token acquisition unit 752. When a certain time of confirmation and a time stamp token corresponding to this time of confirmation match, the verification processing unit 753 determines that this time of confirmation has not been tampered with (no tampering detected). When another time of confirmation and a time stamp token corresponding to this time of confirmation does not match, the verification processing unit 753 determines that this time of confirmation may have been tampered with (tampering detected). The verification processing unit 753 outputs the verification results ("tampering detected" or "no tampering detected" for each time of confirmation, which time of confirmation has been tampered with, etc.) to the output unit 754.

The output unit 754 outputs the verification results received from the verification processing unit 753 to the output device 35 (or the user equipment 42). This allows the user to check the verification results for one or more times of confirmation selected by the user.

Ordering Verification

Figure 11:
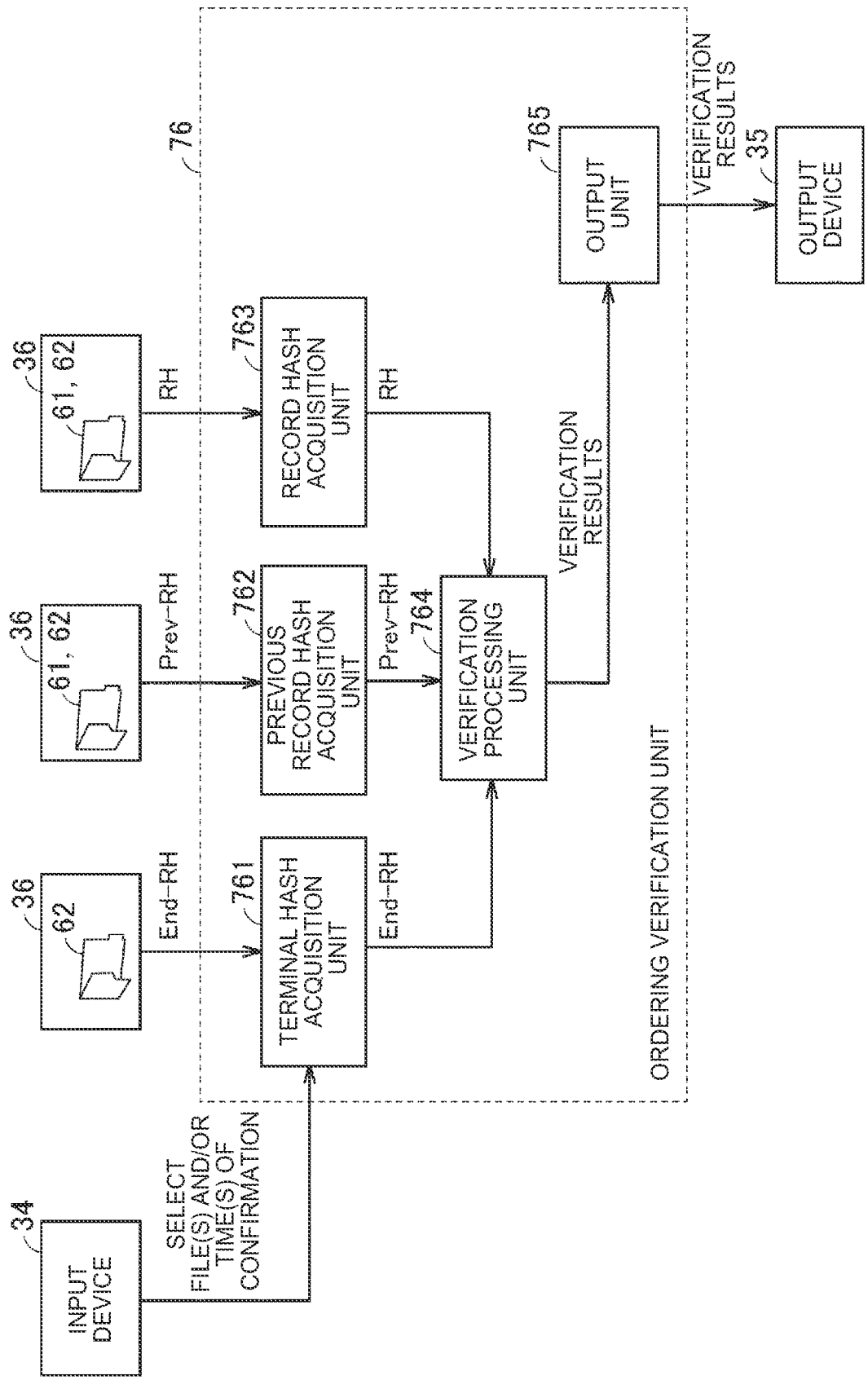
FIG. 11 is a functional block diagram of an ordering verification unit.

FIG. 11 is a functional block diagram of the ordering verification unit 76. The ordering verification unit 76 verifies the ordering of the files whose records are stored in the evidence chain 61 and/or the times of confirmation certified by the time stamp chain 62 (in what temporal order the files and/or the times of confirmation are arranged). The ordering verification unit 76 includes a terminal hash acquisition unit 761, a previous record hash acquisition unit 762, a record hash acquisition unit 763, a verification processing unit 764, and an output unit 765.

First, the user performs on the input device 34 (or the user equipment 42) an operation to select a file(s) and/or a time(s) of confirmation to be verified. This selection is performed by the same method as that described with reference to FIGS. 9 and 10. A situation where a plurality of files and a plurality of times of confirmation are selected will be described below as an example. Each of the terminal hash acquisition unit 761, the previous record hash acquisition unit 762, and the record hash acquisition unit 763 receives which files and which times of confirmation are selected by the user.

The terminal hash acquisition unit 761 acquires from the time stamp chain 62 the terminal hash values (End-RH) of the records corresponding to the selected times of confirmation. The terminal hash acquisition unit 761 outputs the terminal hash values to the verification processing unit 764.

The previous record hash acquisition unit 762 acquires from the evidence chain 61 the previous record hash values (Prev-RH) of the records corresponding to the selected files, and acquires from the time stamp chain 62 the previous record hash values (Prev-RH) of the records corresponding to the selected times of confirmation. The previous record hash acquisition unit 762 outputs the previous record hash values to the verification processing unit 764.

The record hash acquisition unit 763 acquires from the evidence chain 61 the record hash values (RH) of the records corresponding to the selected files, and acquires from the time stamp chain 62 the record hash values (RH) of the records corresponding to the selected times of confirmation. The record hash acquisition unit 763 outputs the record hash values to the verification processing unit 764.

The verification processing unit 764 verifies the temporal order (temporal relationship) of the selected files and the selected times of confirmation based on the terminal hash values received from the terminal hash acquisition unit 761, the previous record hash values received from the previous record hash acquisition unit 762, and the record hash values received from the record hash acquisition unit 763. As described above with reference to FIGS. 3 and 4, the order (parent-child relationship) of the records within the same chain can be identified based on the previous record hash values and the record hash values. The order of the records between different chains can be identified based on the terminal hash values and the record hash values. Therefore, the verification processing unit 764 can identify the order of the files and the times of confirmation. The verification processing unit 764 outputs the verification results (temporal order of the files and the times of confirmation) to the output unit 765.

The output unit 765 outputs the verification results received from the verification processing unit 764 to the output device 35 (or the user equipment 42). This allows the user to check the verification results for one or more files and/or one or more times of confirmation selected by the user.

The situation where a plurality of files and a plurality of times of confirmation are selected is described above as an example. However, only a plurality of files may be selected, and the times of confirmation may not be selected. Alternatively, only a plurality of times of confirmation may be selected, and the files may not be selected. Those skilled in the art would readily understand from the above description that the order of all the records can be identified even in these cases.

Process Flow

Figure 12:
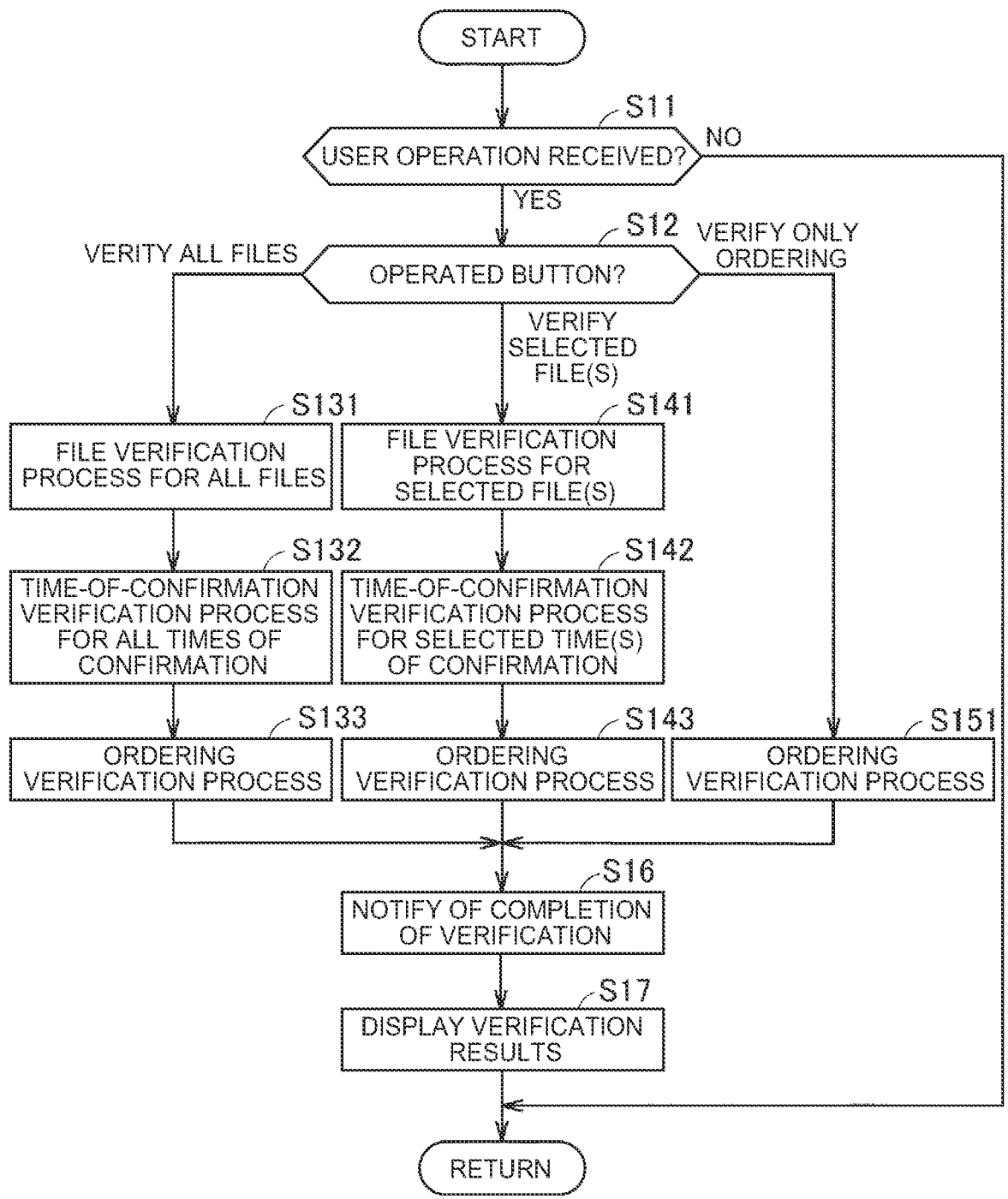
FIG. 12 is a flowchart showing the overall processing procedure of a verification process according to the first embodiment.

FIG. 12 is a flowchart showing an example of the overall processing procedure of a verification process according to the first embodiment. The process shown in this flowchart is called from a main routine and executed when a predetermined condition is satisfied (e.g., in predetermined cycles). Each step is implemented by software processing by the client server 3 (processor 31), but may be implemented by hardware (electric circuitry) in the client server 3. The term "step" is hereinafter abbreviated as "S." The same applies to the flowchart in a second embodiment that will be described later.

In S11, the client server 3 determines whether the input device 34 or the user equipment 42 has received a user operation to select a verification function.

Figure 13:
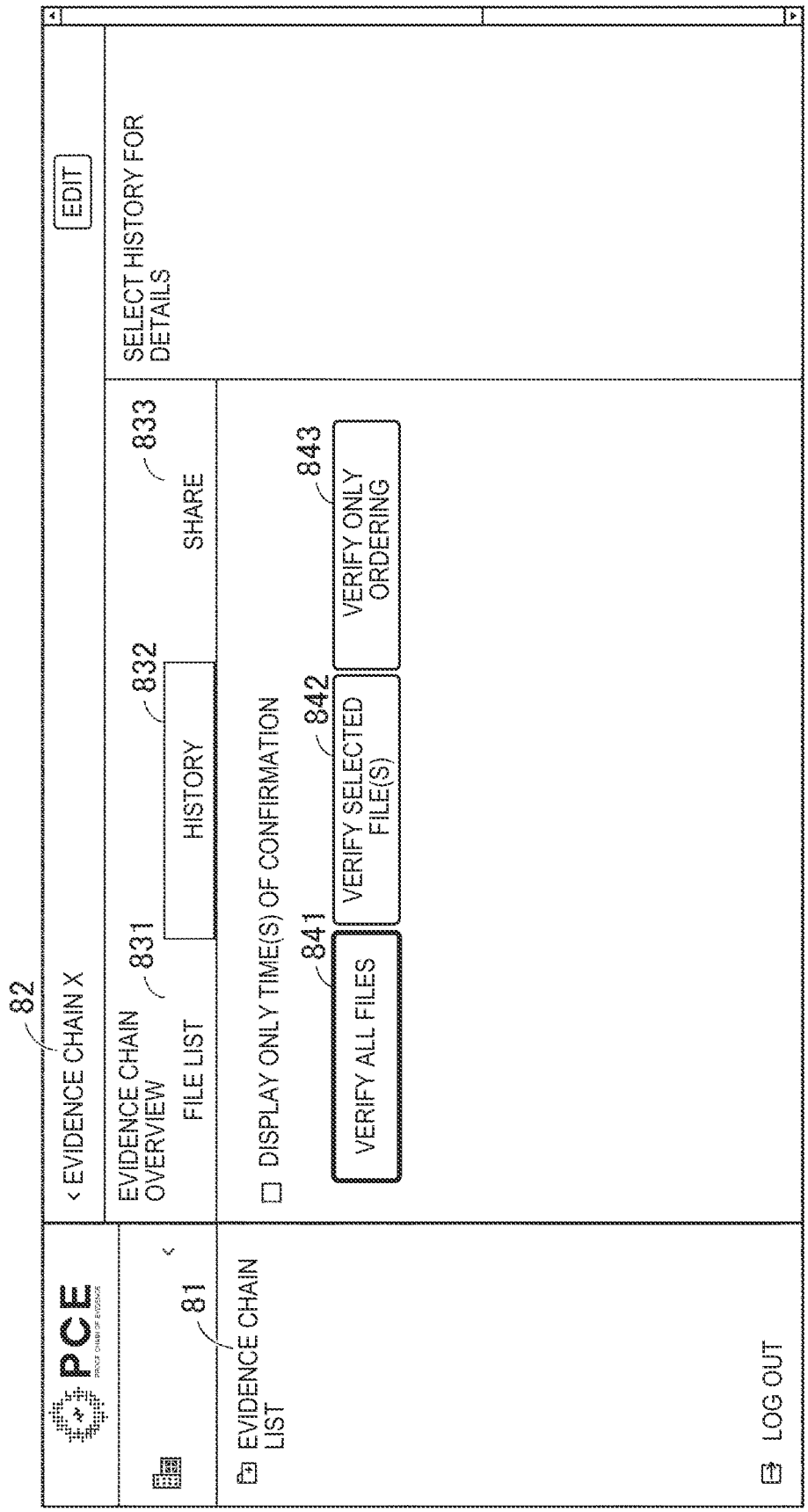
FIG. 13 shows an example of a user interface for a user to select a verification function.

FIG. 13 shows an example of a user interface (UI) for the user to select a verification function. The UI is displayed on the output device 35 or the user equipment 42.

The UI includes, for example, a navigation list 81 indicating selectable evidence chains and a field 82 indicating the evidence chain selected by the user. In this example, the "evidence chain X" is selected. The UI further includes, for example, three tabs 831 to 833. The tab 831 is a tab for displaying a file list. The tab 832 is a tab for displaying a history. The tab 833 is a tab for sharing a file(s).

When the tab 832 for displaying a history is selected, three buttons 841 to 843 for selecting one of three types of verification functions are displayed. The button 841 is a "verify all files" button. The button 842 is a "verify selected file(s)" button. The button 843 is a "verify only ordering" button. In FIG. 13, "verify all files" is selected by operating the button 841.

Referring to FIGS. 12 and 13, when the input device 34 or the user equipment 42 has not received a user operation (more specifically, an operation on any one of the buttons 841 to 843) (NO in S11), the client server 3 does not perform the subsequent steps and the process returns to the main routine.

When the input device 34 or the user equipment 42 has received the user operation (YES in S11), the process proceeds to S12, and the client server 3 determines which of the buttons 841 to 843 is the button operated by the user.

When the button 841 instructing to verify all files is operated ("VERIFY ALL FILES" in S12), the client server 3 executes a file verification process for all the files (S131), a time-of-confirmation verification process for all the times of confirmation (S132), and an ordering verification process (S133). These processes can be executed in any order. The file verification process, the time-of-confirmation verification process, and the ordering verification process are implemented by the file verification unit 74 (see FIG. 9), the time-of-confirmation verification unit 75 (see FIG. 10), and the ordering verification unit 76 (see FIG. 11), respectively.

After executing these three verification processes, the client server 3 notifies the user of completion of the verification processes (S16). The client server 3 may display a message on completion of the verification processes on the output device 35 (or the user equipment 42), or may send an email on completion of the verification processes to the user equipment 42. The client server 3 then displays the verification results on the output device 35 (or the user equipment 42) (S17).

Referring back to S12, when the button 842 instructing to verify a selected file(s) is operated ("VERIFY SELECTED FILE(S)" in S12), the client server 3 executes a file verification process for the selected file(s) (S141), a time-of-confirmation verification process for the selected time(s) of confirmation (S142), and an ordering verification process (S143). The client server 3 then notifies the user of completion of the verification (S16), and displays the verification results on the output device 35 (or the user equipment 42) (S17).

When the button 843 instructing to verify only ordering is operated ("VERIFY ONLY ORDERLING" in S12), the client server 3 executes an ordering verification process (S151). The client server 3 then notifies the user of completion of the verification (S16), and displays the verification results on the output device 35 or the user equipment 42 (S17).

The file verification process, the time-of-confirmation verification process, and the ordering verification process correspond to the "first verification process," the "second verification process," and the "third verification process" according to the present disclosure, respectively. The operation of the button 842 instructing to verify a selected file(s) corresponds to the "first user operation" according to the present disclosure. The operation of the button 841 instructing to verify all files corresponds to the "second user operation" according to the present disclosure. The operation of the button 843 instructing to verify only ordering corresponds to the "third user operation" according to the present disclosure.

Display of Verification Results

Hereinafter, how the UI that displays the verification results is different according to which of "verify all files," "verify a selected file(s)," and "verify only ordering" is selected will be described.

Verify all Files

Figure 14:
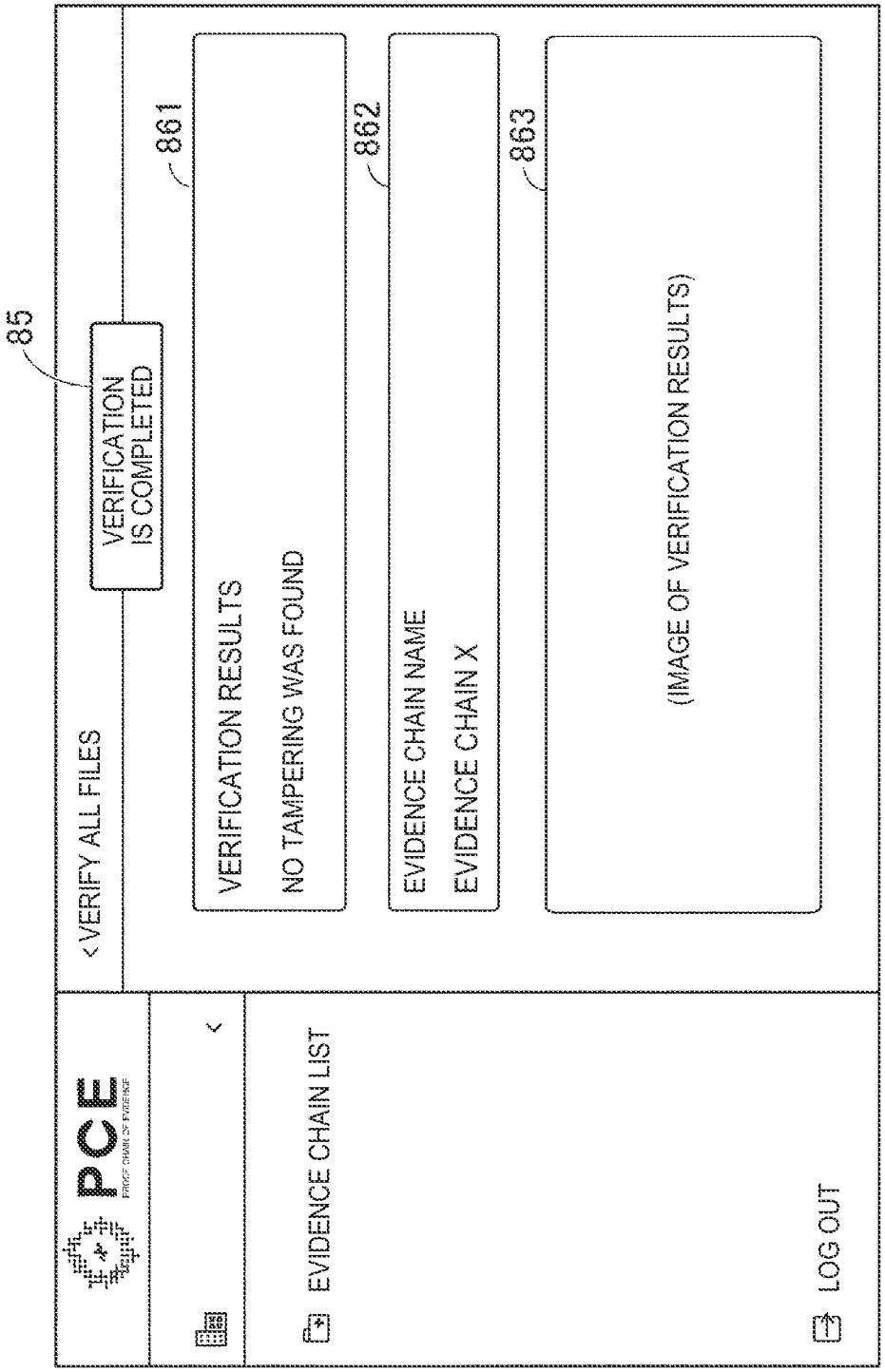
FIG. 14 shows an example of the user interface displaying the verification results when "verify all files" is selected.

FIG. 14 shows an example of the UI displaying the verification results when "verify all files" is selected. When the verification processes are completed, a first box 861, a second box 862, and a third box 863 are displayed together with a notification 85 stating that "verification is completed."

The first box 861 shows a summary (conclusion) of the verification results. For example, when tampering is found in any record (file or time of confirmation), a message stating that "tampering was found" is displayed in the first box 861. When no tampering is found in any record, a message stating that "no tampering was found" is displayed in the first box 861, as shown in FIG. 14.

The second box 862 indicates the evidence chain subjected to the verification processes. In the example shown in FIG. 14, the "evidence chain X" is displayed in the second box 862.

The third box 863 graphically shows details of the verification results. As described in FIGS. 3 and 4, the generations of files and the generations of times of confirmation are managed independently of each other in separate chains. In the following description of the verification results, the generations of files are denoted by the letter "A" at the end, and the generations of times of confirmation are denoted by the letter "B" at the end in order to distinguish therebetween. However, this distinguishing is made in order to avoid confusion and facilitate understanding, and is not essential.

Figure 15:
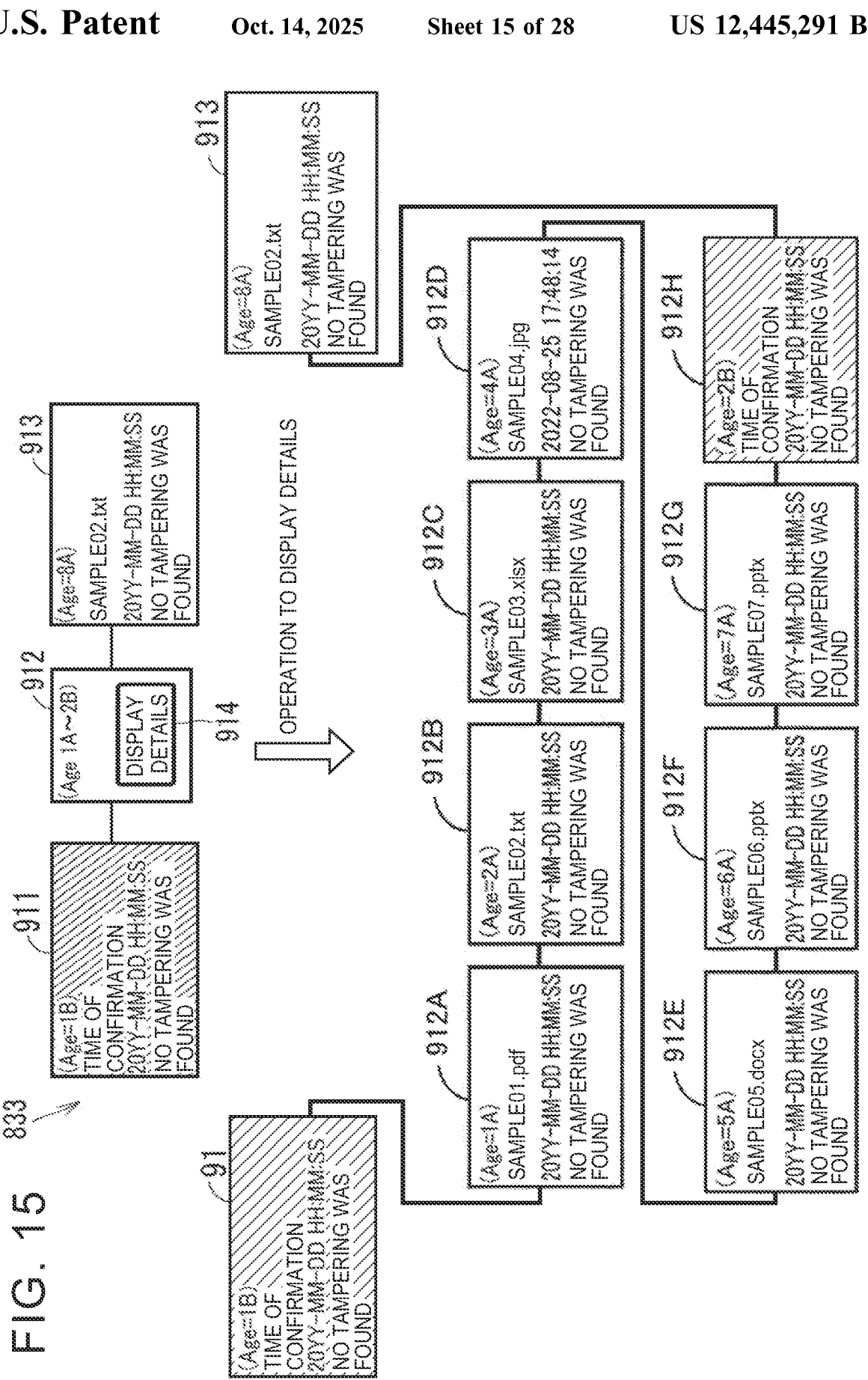
FIG. 15 shows an example of the display of the verification results in a third box when "verify all files" is selected.

FIG. 15 shows an example of the display of the verification results in the third box 863 when "verify all files" is selected. It is herein assumed that three or more files are selected. In this case, for example, a section 911 showing the verification result for the starting record and a section 913 showing the verification result for the terminal record are displayed. In the example shown in FIG. 15, the section 911 shows the verification result of the time-of-confirmation verification process as to whether the time of confirmation ofAge=1B has been tampered with. The section 913 shows the verification result of the file verification process as to whether the file of Age=8A has been tampered with.

For the records between the starting record and the terminal record, a blank section 912 that does not include any verification results (whether the files or times of confirmation of Age=1A to 2B have been tampered with) is displayed. That is, the display is omitted for the records between the starting record and the terminal record. When the user selects a "display details" button 914 in the section 912, sections 912A to 912H showing the verification results for the intermediate records are displayed. The files and times of confirmation in the sections 911, 912A to 912H, and 913 are arranged in chronological order based on the results of the ordering verification process. As described above, the display of the records between the starting record and the terminal record is omitted to simplify the overall display. This makes it easier for the user to grasp the summary of the verification results. When only one or two files are selected, the middle section 912 is not displayed.

When "verify all files" is selected, the verification results for all the files and all the times of confirmation are displayed. Therefore, "verify all files" is particularly effective when trouble (suspected tampering) occurs between users. This is because a certain user can convince another user by presenting all the verification results to the another user.

In the example shown in FIG. 15, the size of the sections 911, 913 at both ends is larger than the size of the intermediate sections 912A to 912H. It is desirable that the section showing the verification result for the starting record and the section showing the verification result for the terminal record be displayed larger than the sections showing the verification results for the records between the starting record and the terminal record, as described above. This allows the user to easily check the verification results for the starting record and the terminal record.

It is also desirable that the sections showing the verification result as to whether the file has been tampered with and the sections showing the verification result as to whether the time of confirmation has been tempered with be displayed in different manners. In FIG. 15, this difference in display is represented by whether the sections are hatched. This allows the user to easily distinguish between the verification result as to whether the file has been tampered with and the verification result as to whether the time of confirmation has been tampered with.

In particular, it is desirable that the sections showing the verification result as to whether the time of confirmation has been tampered with be more highlighted than the sections showing the verification result as to whether the file has been tampered with. This allows the user to easily distinguish the verification result regarding the time of confirmation from the verification result regarding the file and check the verification result regarding the time of confirmation. This is because, although the number of added times of confirmation is generally smaller than the number of registered files, the times of confirmation often contribute to solving trouble.

Various known methods can be used for the highlighting. For example, the above two types of sections may be displayed in different colors. The verification result as to whether the time of confirmation has been tampered with can be highlighted by using the characteristics based on color combinations (warm and cool colors, advancing and receding colors, expanding and contracting colors, etc.). The sections showing the verification result as to whether the time of confirmation has been tampered with may be displayed in a dark color, and the sections showing the verification result as to whether the file has been tampered with may be displayed in a light color. Even when those colors are in the same family, the dark color highlights the sections to a great extent, and the light color highlights the sections to a small extent. The sections showing the verification result as to whether the time of confirmation has been tampered with may be displayed larger than the sections showing the verification result as to whether the file has been tampered with. A frame may be added only to the sections showing the verification result as to whether the time of confirmation has been tampered with. Only the sections showing the verification result as to whether the time of confirmation has been tampered with may be displayed in a flashing mode.

In the example shown in FIG. 15, the year, month, date, hour, minute, and second are displayed as the time of confirmation. However, the user may be allowed to select that only part of the year, month, date, hour, minute, and second is displayed. For example, only the year, only the year and month, or only the year, month, and date may be displayed according to the user operation. By allowing the user to select the temporal granularity as appropriate, the user can easily check the time of confirmation of the necessary granularity.

Verify Selected File(s)

Figure 16:
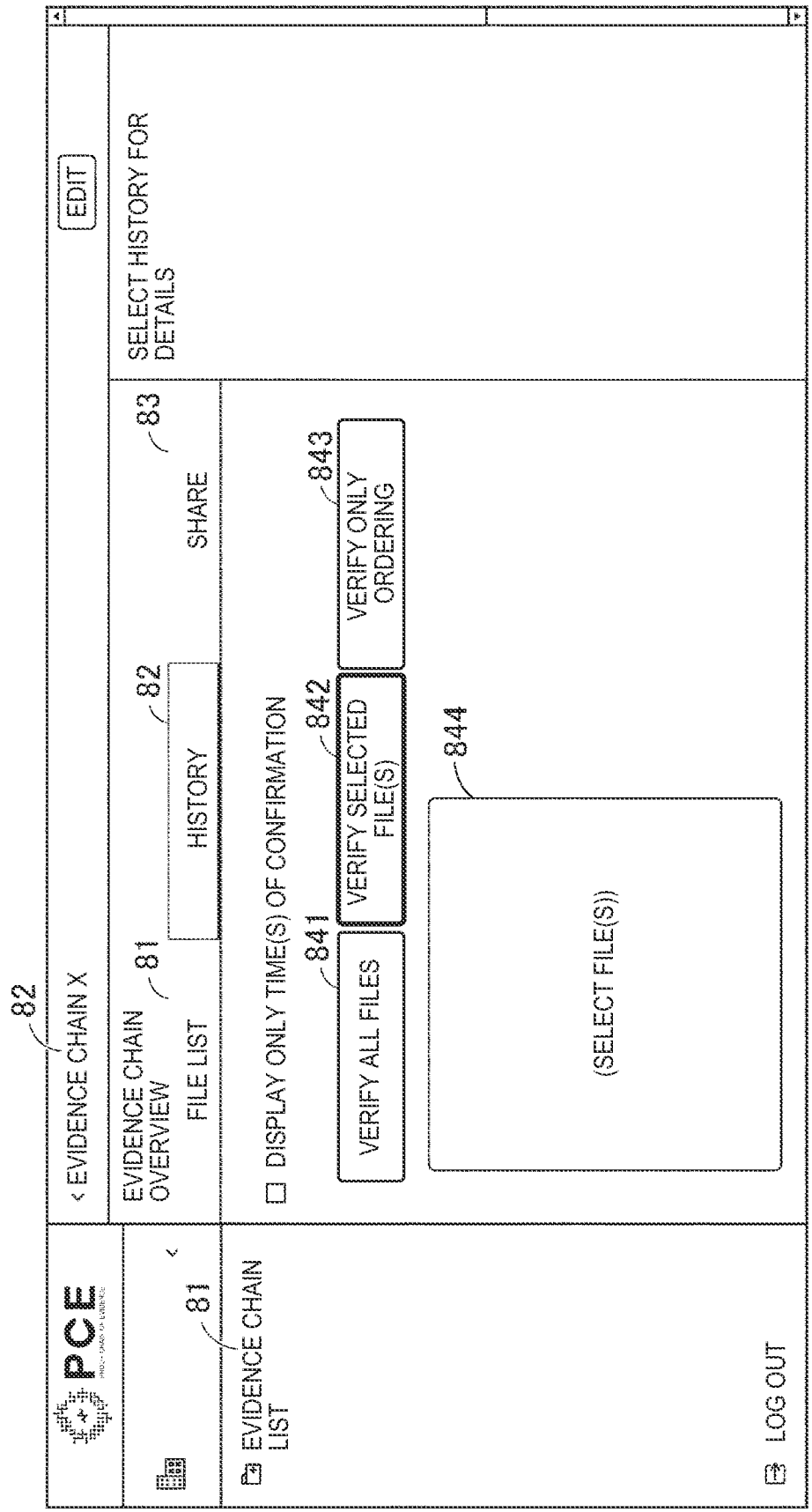
FIG. 16 shows an example of the user interface displayed before the start of verification processes when "verify selected file(s)" is selected.

FIG. 16 shows an example of the UI displayed before the start of the verification processes when "verify selected file(s)" is selected. When the button 842 instructing to "verify selected file(s)" is operated, a file selection box 844 is displayed for the user to select a file(s) to be verified.

Figure 17:
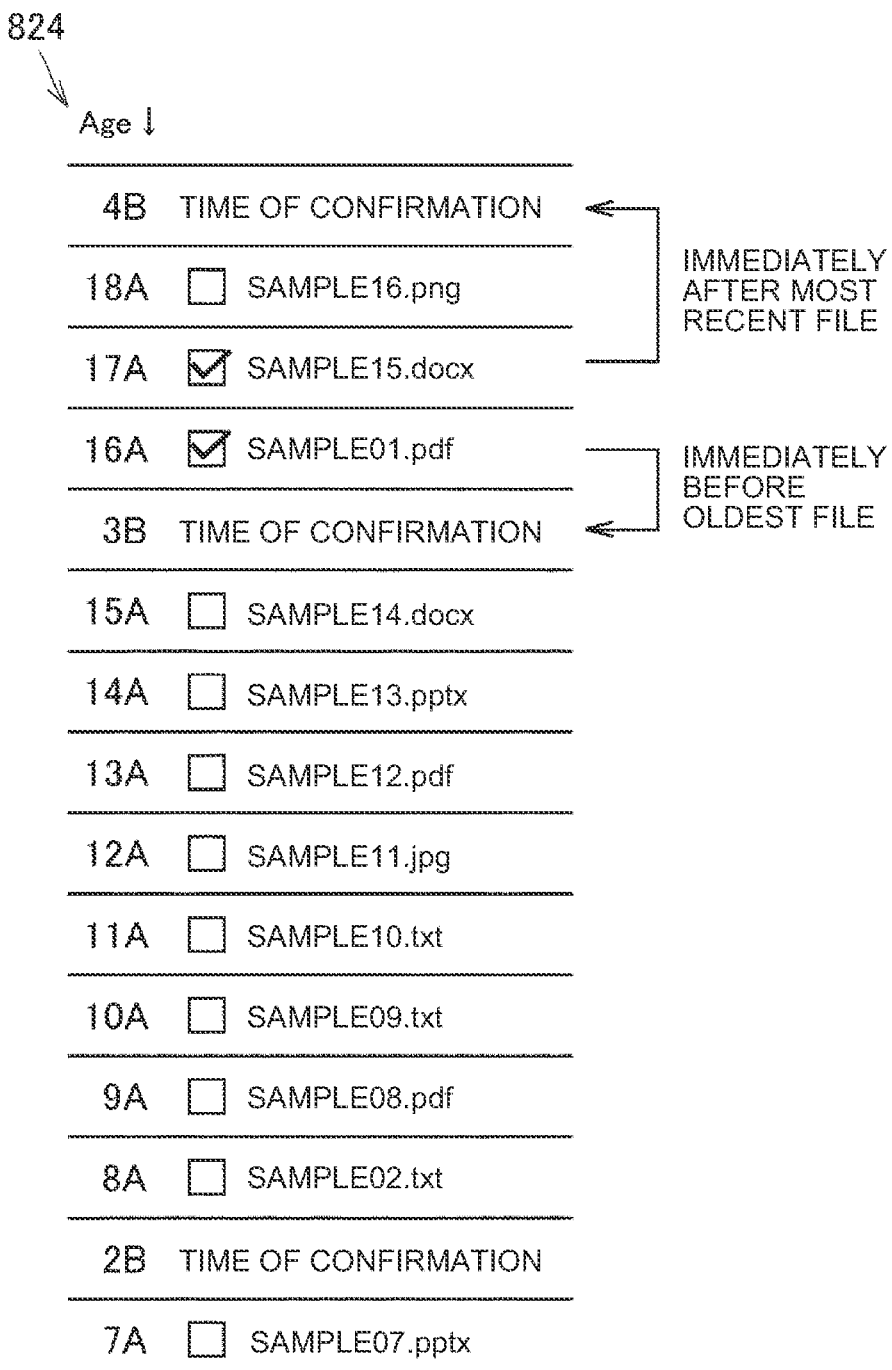
FIG. 17 shows an example of the display in a file selection box.

FIG. 17 shows an example (first example) of the display in the file selection box 844. In the file selection box 844, the names of the files whose file hash values are stored in the selected evidence chain 61 and their associated times of confirmation are displayed in, for example, ascending or descending order (descending order in FIG. 17). A file is selected when the user checks a checkbox next to the name of the file. In the present embodiment, the time of confirmation is automatically selected according to the selected file.

In the example shown in FIG. 17, the file of Age=17A and the file of Age=16A are selected by the user. In this case, the time of confirmation of Age=4B immediately after the most recent file of Age=17A out of the files selected by the user and the time of confirmation of Age=3B immediately before the oldest file of Age=16A out of the files selected by the user are automatically selected. The time of confirmation "immediately after" the most recent file is the time of confirmation that is later than and closest to the most recent file in the temporal order of the files and times of confirmation. The time of confirmation "immediately before" the oldest file is the time of confirmation that is earlier than and closest to the oldest file in the temporal order of the files and times of confirmation.

Figure 18:
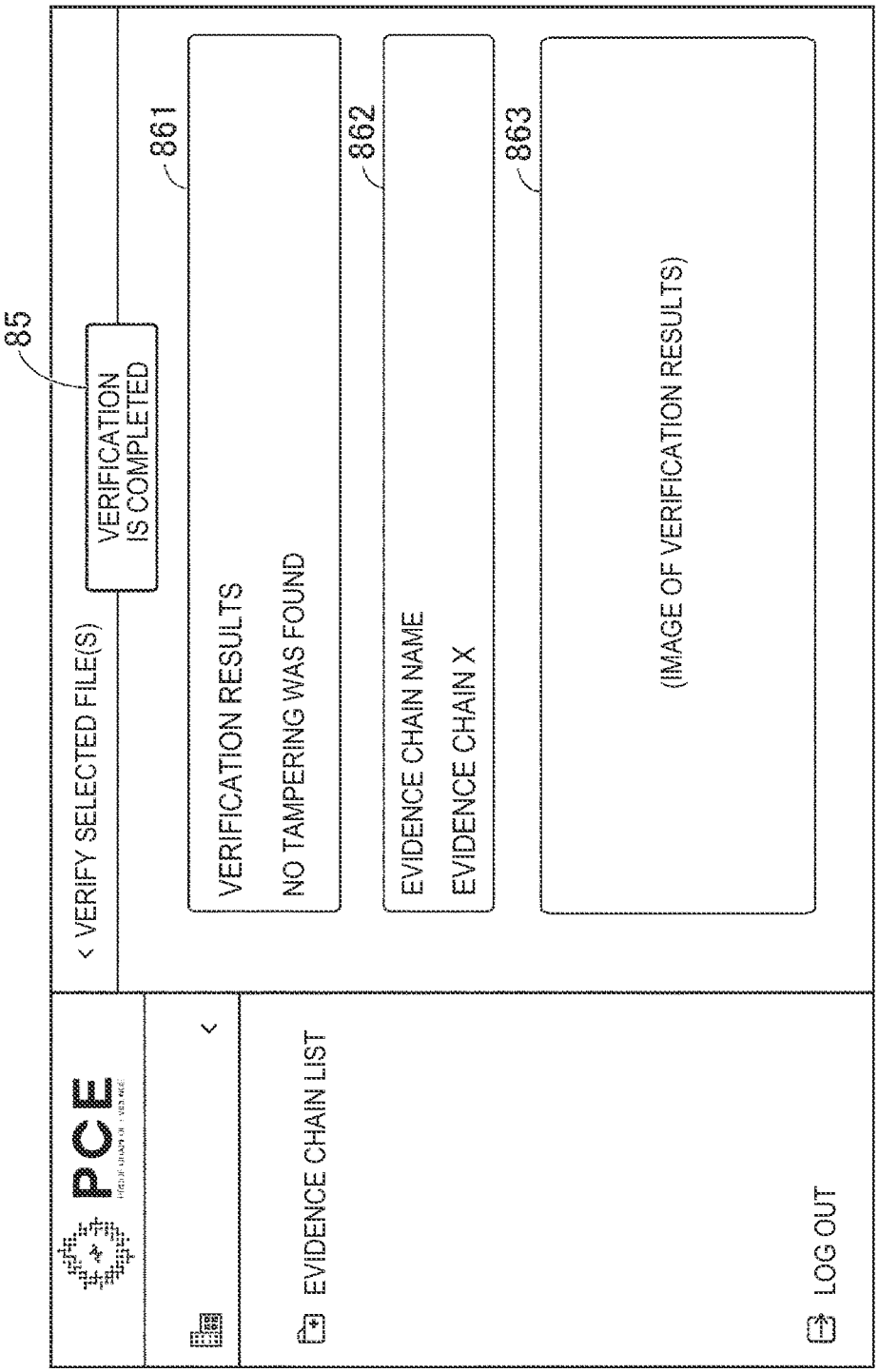
FIG. 18 shows an example of the user interface displaying the verification results when "verify selected file(s)" is selected.

FIG. 18 shows an example of the UI displaying the verification results when "verify selected file(s)" is selected. As in the case where "verify all files" is selected (see FIG. 14), details of the verification results are graphically displayed in the third box 863.

Figure 19:
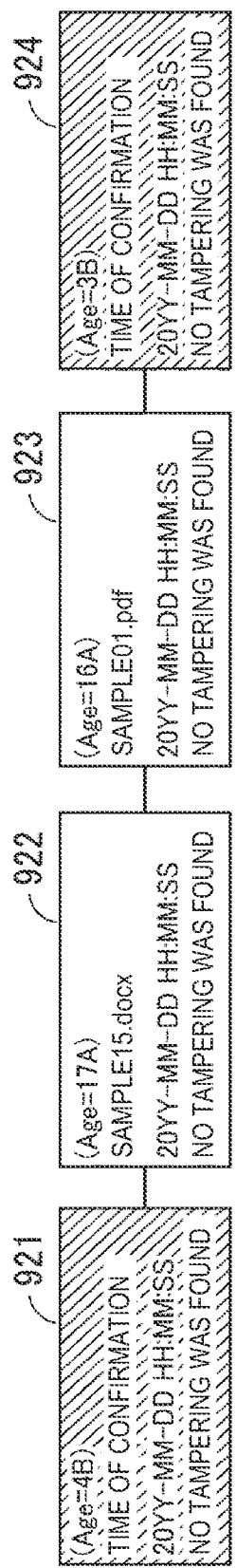
FIG. 19 shows an example of the display of details of the verification results in the third box when "verify selected file(s)" is selected.

FIG. 19 shows an example of the display of details of the verification results in the third box 863 when "verify selected file(s)" is selected. When the files are selected as described with reference to FIG. 17, at least four sections 921 to 924 are displayed as shown in FIG. 19.

The section 921 shows the verification result of the time-of-confirmation verification process for the automatically selected time of confirmation of Age=4B. The section 922 shows the verification result of the file verification process for the file of Age=17A selected by the user. The section 923 shows the verification result of the file verification process for the file of Age=16A selected by the user. The section 924 shows the verification result of the time-of-confirmation verification process for the automatically selected time of confirmation of Age=3B.

As described above, in the example shown in FIG. 17, the file of Age=16A selected by the user, the file of Age=17A selected by the user, and the time of confirmation of Age=3B immediately before the oldest file, and the time of confirmation of Age=4B immediately after the most recent file are to be verified (see FIG. 19). It can thus be proved that the file of Age=16A and the file of Age=17A were stored in the distributed ledger 6 (evidence chain 61) between the time of confirmation of Age=3B and the time of confirmation of Age=4B. According to the present embodiment, it is therefore possible to effectively verity the ordering of the files and times of confirmation with a simple user operation. Although two files are selected in the example shown in FIG. 17, three or more files may be selected.

Figure 20:
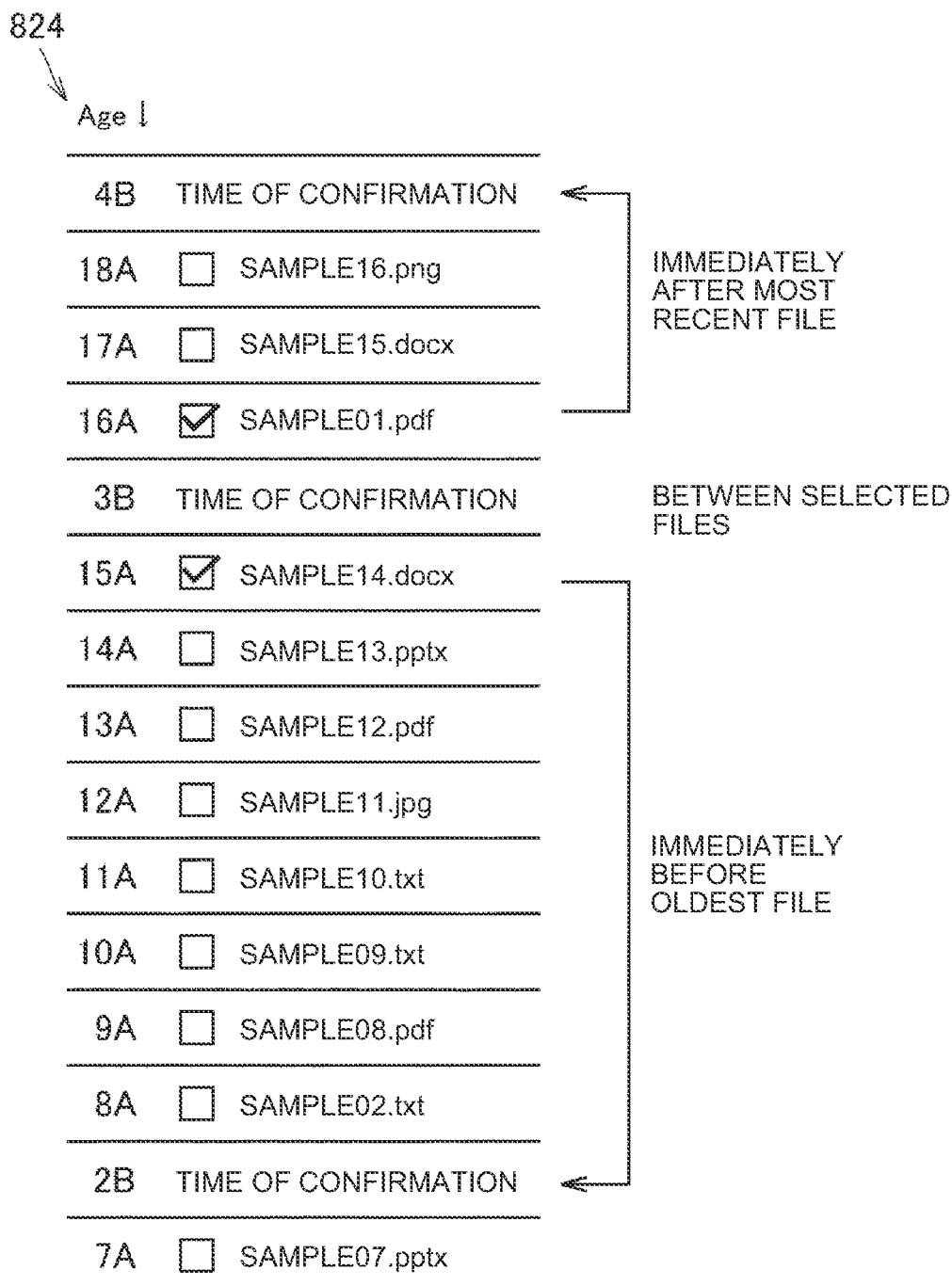
FIG. 20 shows another example of the display in the file selection box.

FIG. 20 shows an example (second example) of the display in the file selection box 844. In the example shown in FIG. 20, the file of Age=16A and the file of Age=15A are selected by the user. In this case, the time of confirmation of Age=2B immediately before the oldest file and the time of confirmation of Age=4B immediately after the most recent file are automatically selected. In addition, the time of confirmation of Age=3B between the most recent file and the oldest file is also automatically selected.

Figure 21:
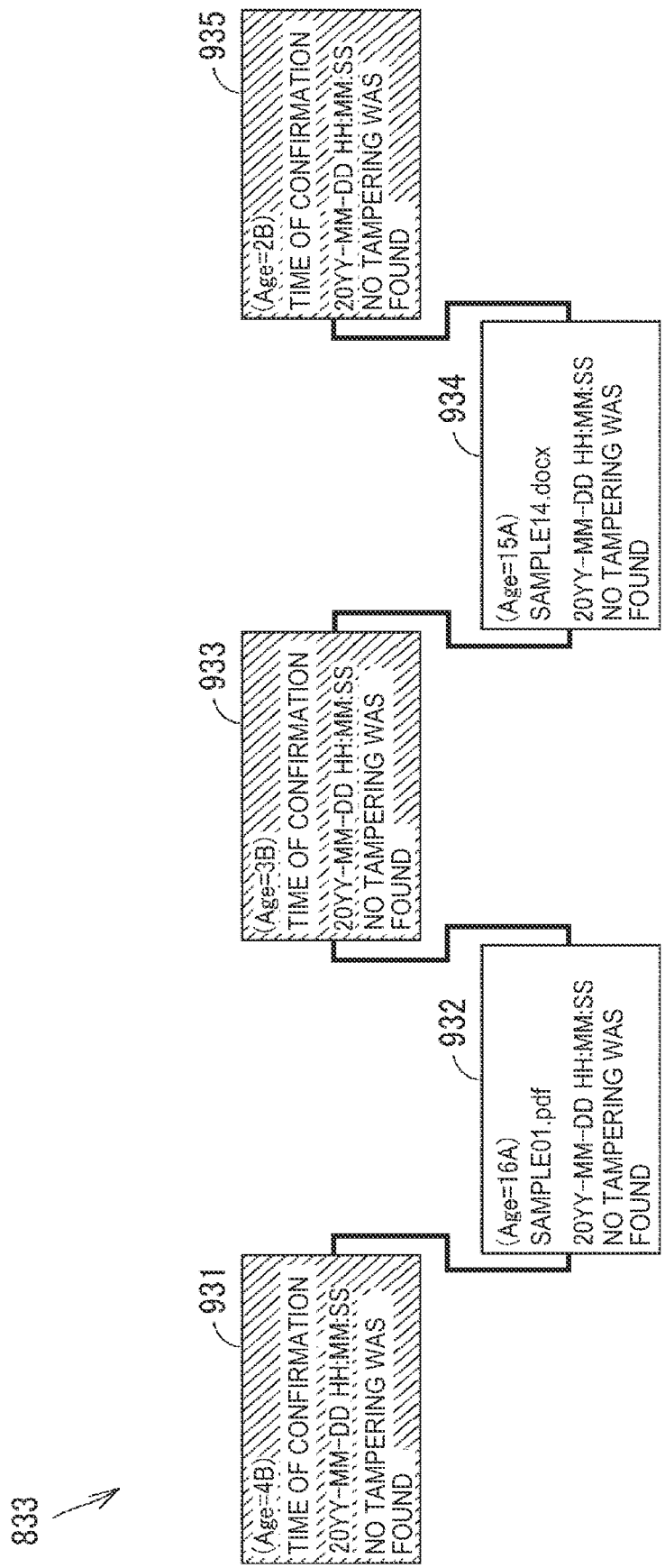
FIG. 21 shows another example of the display of details of the verification results in the third box when "verify selected file(s)" is selected.

FIG. 21 shows another example of the display of details of the verification results in the third box 863 when "verify selected file(s)" is selected. When the files are selected as described with reference to FIG. 20, at least five sections 931 to 935 are displayed as shown in FIG. 21.

The section 931 shows the verification result of the time-of-confirmation verification process for the automatically selected time of confirmation of Age=4B. The section 932 shows the verification result of the file verification process for the file of Age=16A selected by the user. The section 933 shows the verification result of the time-of-confirmation verification process for the automatically selected time of confirmation of Age=3B. The section 934 shows the verification result of the file verification process for the file of Age=15A selected by the user. The section 935 shows the verification result of the time-of-confirmation verification process for the automatically selected time of confirmation of Age=2B.

In "verify selected file(s)," the verification results for the files selected by the user (and the times of confirmation automatically selected based on the selected files) are displayed. In other words, in "verify selected file(s)," unselected files (and times of confirmation that would be automatically selected based on these files) are not verified. Therefore, the time required to "verify selected file(s)" is shorter than the time required to "verify all files." Therefore, "verify selected file(s)" is particularly effective when, for example, the range of files or times of confirmation that may be subject to trouble (suspected tampering) is narrowed down in advance.

In the example shown in FIG. 20, the time of confirmation of Age=3B is present between the file of Age=15A and the file of Age=16A. In this case, as shown in FIG. 21, the temporal order of the file of Age=15A and the time of confirmation of Age=3B is proved, and the temporal order of the file of Age=16A and the time of confirmation of Age=3B is proved. According to the present embodiment, the ordering of the files and times of confirmation can thus be verified in more detail.

Verify Only Ordering

Figure 22:
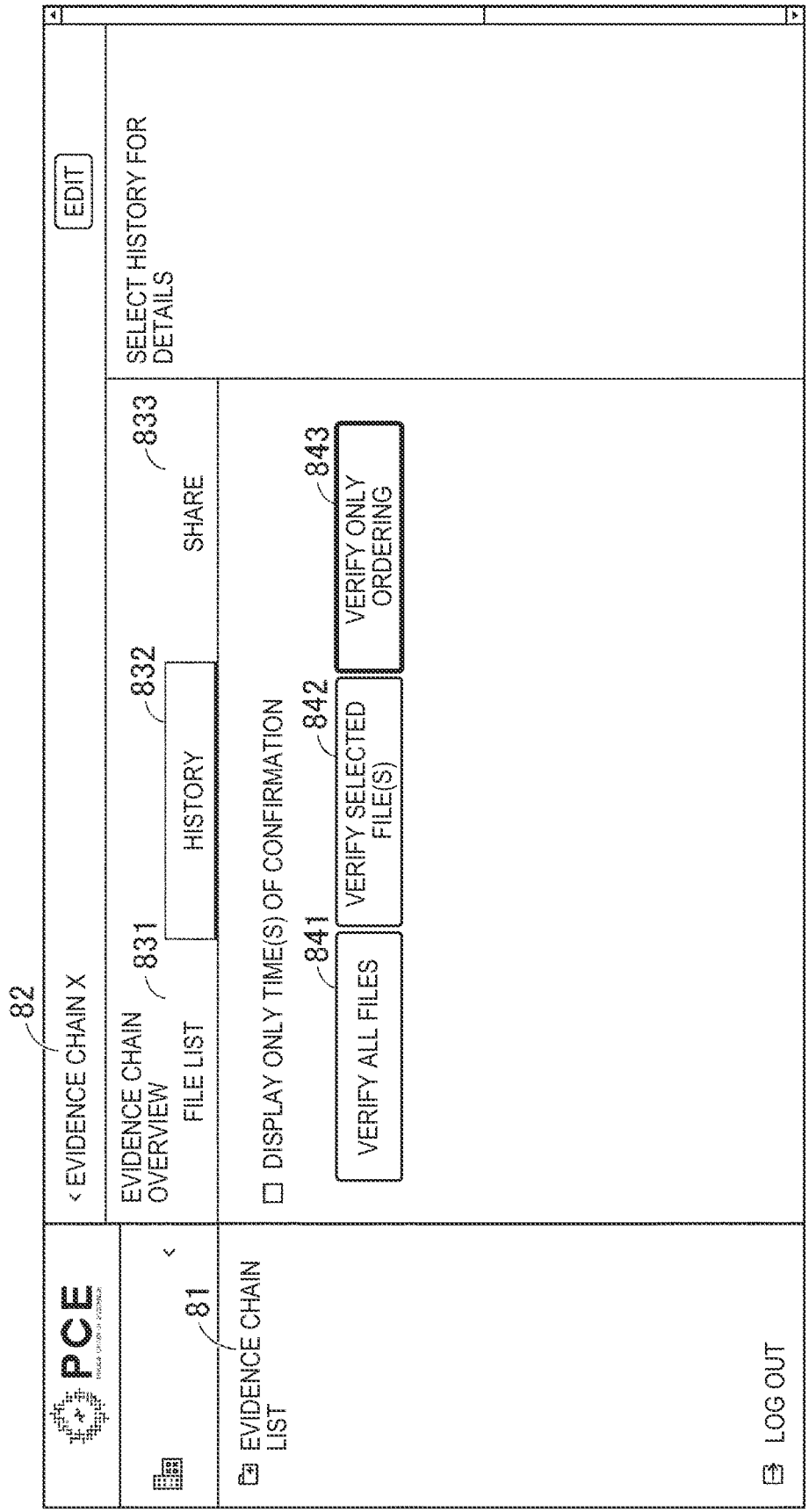
FIG. 22 shows an example of the user interface displayed before the start of a verification process when "verify only ordering" is selected.

FIG. 22 shows an example of the UI displayed before the start of the verification process when "verify only ordering" is selected. When the button 843 instructing "verify only ordering" is operated, the ordering of all the files whose records are stored in the subject evidence chain (and all the times of confirmation associated with the files) are verified. The integrity of the files and times of confirmation is not verified.

Figure 23:
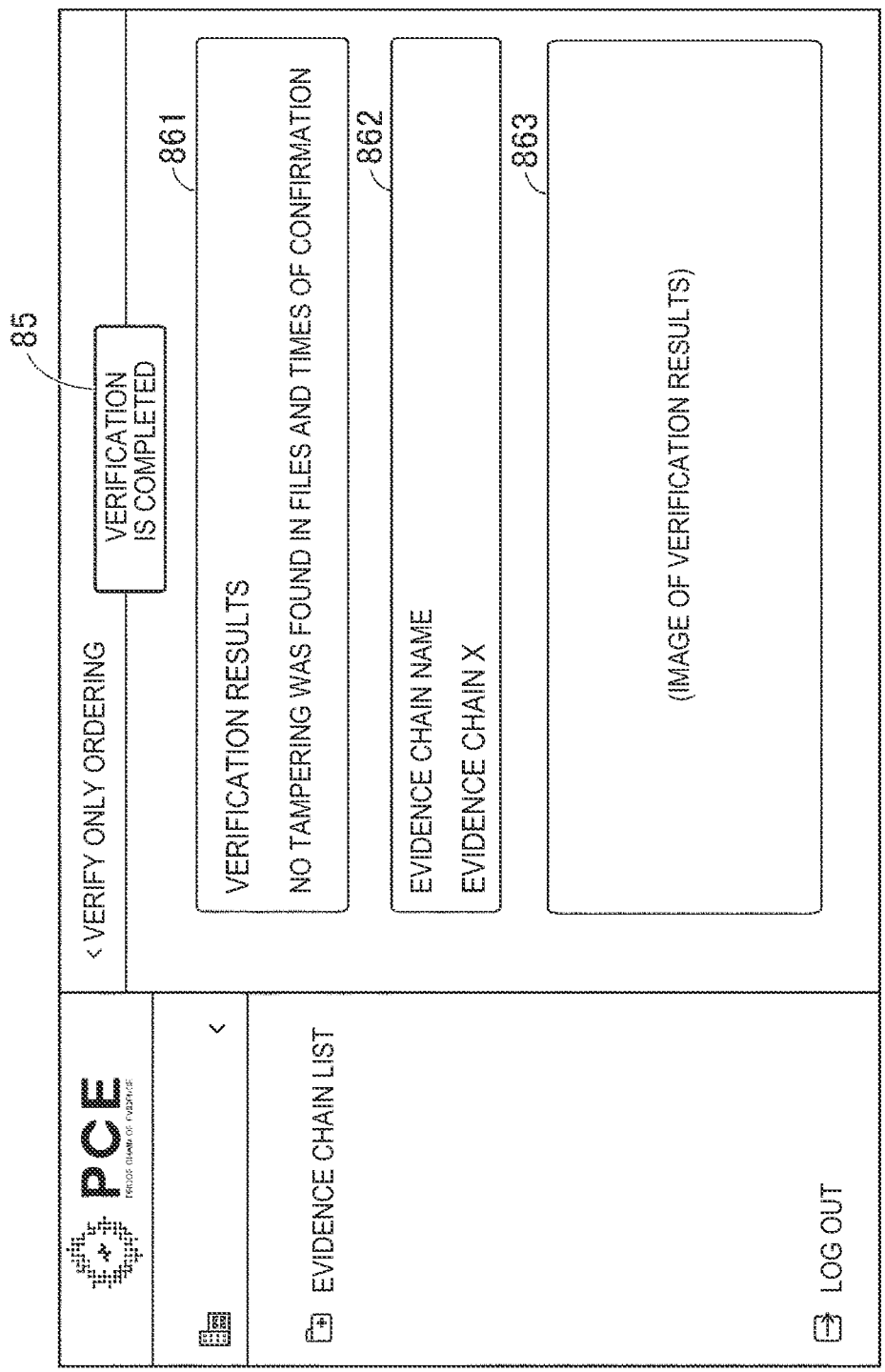
FIG. 23 shows an example of the user interface displaying the verification results when "verify only ordering" is selected.

FIG. 23 shows an example of the UI displaying the verification results when "verify only ordering" is selected. As in the case where "verify all files" or "verify selected file(s)" is selected (see FIGS. 14 and 18), details of the verification results are graphically displayed in the third box 863.

Figure 24:
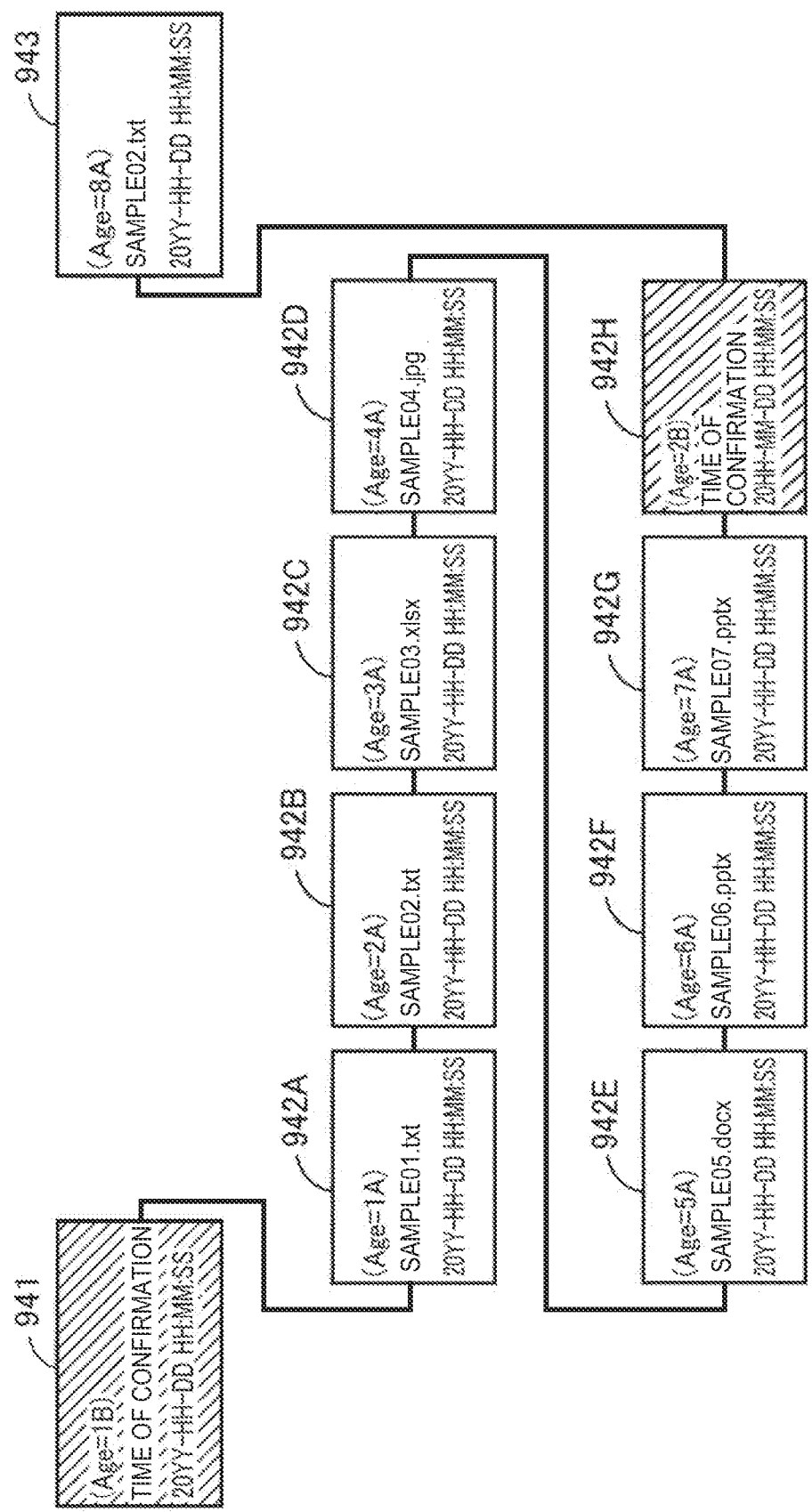
FIG. 24 shows an example of the display of details of the verification results in the third box when "verify only ordering" is selected.

FIG. 24 shows an example of the display of details of the verification results in the third box 863 when "verify only ordering" is selected. Description will be given using the same example as in FIG. 15. A section 941 showing the verification result for the starting record, sections 942A to 942H showing the verification results for the intermediate records, and a section 943 showing the verification result for the terminal record are displayed in chronological order based on the results of the ordering verification process. The message stating that "tampering was found" or "no tampering was found" is not displayed in these sections.

As described above, in the first embodiment, the client server 3 is configured to execute the file verification process, the time-of-confirmation verification process, and the ordering verification process. The integrity of the files (whether the files have been tampered with) can be verified by the file verification process. The integrity of the times of confirmation (whether the times of confirmation have been tampered with) can be verified by the time-of-confirmation verification process. The ordering of the files and times of confirmation in the distributed ledger 6 can be verified by the ordering verification process. According to the first embodiment, it is therefore possible to verify whether the files and the times of confirmation are properly managed.

The client server 3 is configured to allow the user to select one of the following options: "verify all files," "verify selected file(s)," and "verify only ordering." Verification requested by the user can thus be performed at the timing desired by the user.

When "verify all files" is selected, the integrity of all the files and the integrity of all the times of confirmation are verified. The integrity of the files and times of confirmation can thus be thoroughly verified. When "verify selected file(s)" is selected, the object to be verified is limited to part of the files and/or part of the times of confirmation that is selected by the user. This can reduce the verification cost (workload, time, system load, etc.) as appropriate. When "verify only ordering" is selected, the ordering of the files and times of confirmation is selectively verified. The ordering can thus be efficiently verified when integrity verification is not required.

Second Embodiment

An example in which one time stamp chain 62 is associated with one evidence chain 61 is described in the first embodiment (see FIG. 4). An example in which one time stamp chain is associated with a plurality of evidence chains will be described in a second embodiment. The configurations of the data management system and client server according to the second embodiment are the same as the configurations of the data management system 1 and client server 3 according to the first embodiment (see FIGS. 1 and 2).

Distributed Ledger

FIG. 25 shows an example of the data structure of the distributed ledger 6 of the second embodiment. In this example, three evidence chains 63X, 63Y, and 63Z are associated with one time stamp chain 64. Each of the evidence chains 63X, 63Y, and 63Z is similar to the evidence chain 61 (see FIG. 3) described in the first embodiment. Hereinafter, the evidence chains 63X, 63Y, and 63Z will also be referred to as evidence chains X, Y, and Z, respectively, for simplicity.

In this example, the time stamp chain 64 includes eight records R41 to R48. Like the records stored in the time stamp chain 62 (see FIG. 3) of the first embodiment, each record includes a key (Key), a generation (Age), data (Data), a nonce value (Nonce), an electronic signature (Sig), a previous record hash value (Prev-RH), and a record hash value (RH). The time stamp chain 64 is different from the time stamp chain 62 in that the terminal hash value(s) of one, two, or all of the three evidence chains X, Y, and Z is (are) stored as a terminal hash value(s) (records R41, R43, R45, and R47). Information other than the above included in the time stamp chain 64 is similar to the corresponding information in the time stamp chain 62.

Figure 26:
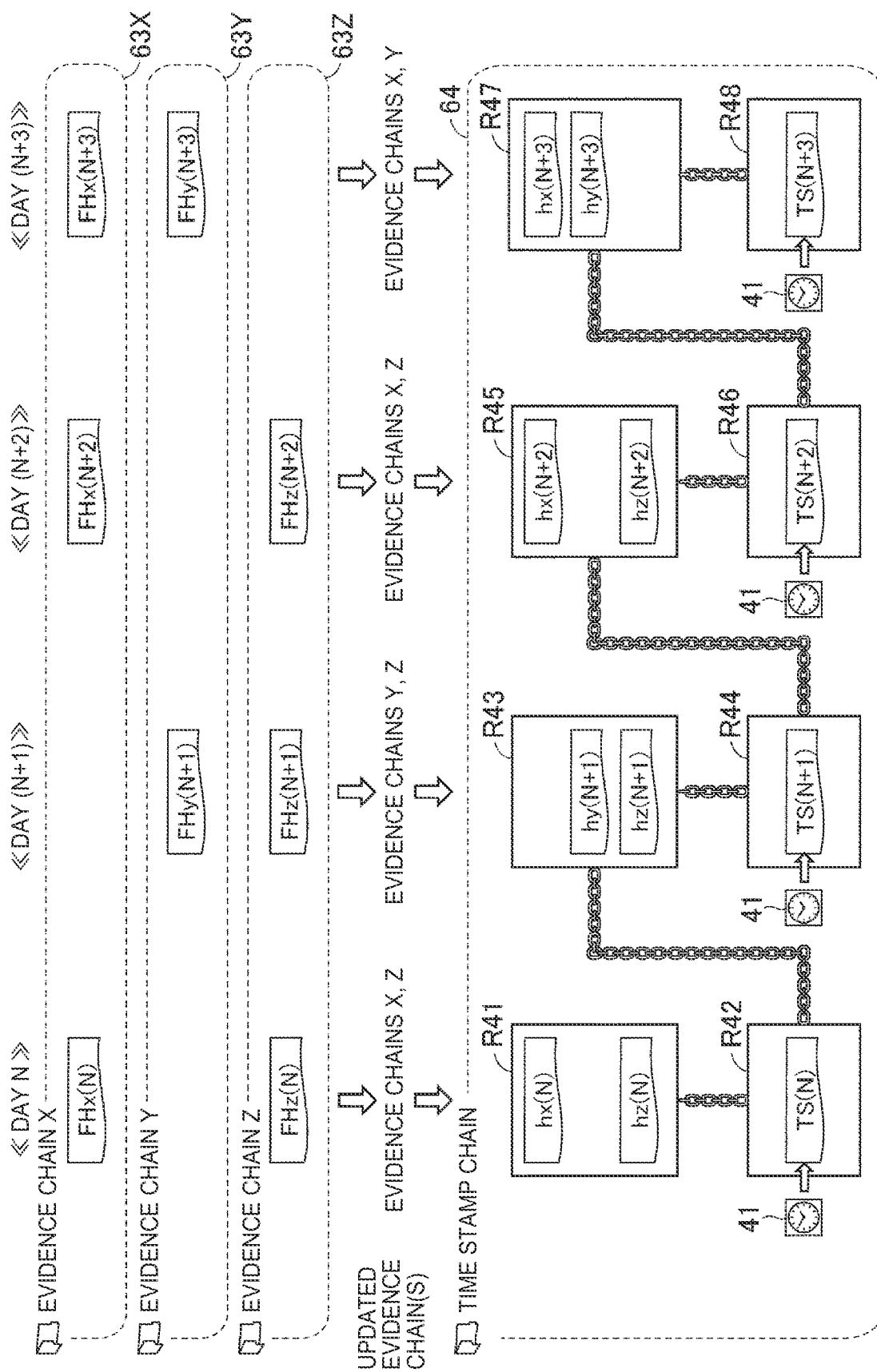
FIG. 26 is a conceptual diagram illustrating the relationship among records stored in evidence chains and a time stamp chain according to the second embodiment.

FIG. 26 is a conceptual diagram illustrating the relationship among the records stored in the evidence chains X, Y, and Z and the time stamp chain 64 according to the second embodiment. In the second embodiment, an update process for updating the time stamp chain 64 is repeatedly executed. The update process may be executed every predetermined period. In this example, the update process is executed once a day.

On the other hand, the evidence chains X, Y, and Z are not necessarily updated every day. Therefore, in the second embodiment, only information on the evidence chain(s) that has (have) been updated since the previous execution of the update process (i.e., the previous day) out of the evidence chains X, Y, and Z is stored in the time stamp chain 64. How the time stamp chain 64 is updated each day will be described below with reference to FIGS. 25 and 26. The file hash values (FH), terminal hash values (h), and time stamp tokens (TS) that are stored as data (Data) in the records are shown in FIG. 26. However, the previous record hash values and the record hash values are not shown in FIG. 26 in order to avoid complexity of the figure.

Day N

It is herein assumed that only the evidence chains X, Z are updated on day N. A new file hash value FHx(N) and a terminal hash value hx(N) of the evidence chain X generated based on the file hash value FHx(N) are stored in the evidence chain X. Similarly, a new file hash value FHz(N) and a terminal hash value hz(N) of the evidence chain Z generated based on the file hash value FHz(N) are stored in the evidence chain Z.

The client server 3 stores the terminal hash value hx(N) of the evidence chain X on day N and the terminal hash value hz(N) of the evidence chain Z on day N in the terminal record R41 at that time of the time stamp chain 64. The client server 3 also generates a terminal hash value H(N) based on the terminal hash value hx(N) and the terminal hash value hz(N) (and other pieces of information (generation, nonce value, electronic signature, etc.) stored in the terminal record R41), and stores the generated terminal hash value H(N) in the record R41 as a record hash value. The terminal hash value H(N) is an example of the "terminal value" according to the present disclosure.

In addition, the client server 3 acquires a time stamp token TS(N) for the terminal hash value H(N) from the Time Stamp Authority 41. The client server 3 stores the time stamp token TS(N), the previous record hash value H(N), and a record hash value H(N+1) in the record R42.

Day (N+1)

It is herein assumed that only the evidence chains Y, Z are updated on day (N+1). A new file hash value FHy(N+1) and a terminal hash value hy(N+1) of the evidence chain Y generated based on the file hash value FHy(N+1) are stored in the evidence chain Y. Similarly, a new file hash value FHz(N+1) and a terminal hash value hz(N+1) of the evidence chain Z generated based on the file hash value FHz(N+1) are stored in the evidence chain Z.

The client server 3 stores the terminal hash value hy(N+1) of the evidence chain Y on day (N+1) and the terminal hash value hz(N+1) of the evidence chain Z on day (N+1) in the terminal record R43 at that time of the time stamp chain 64. The client server 3 also generates a terminal hash value H(N+2) of the time stamp chain 64 based on the terminal hash value hy(N+1) and the terminal hash value hz(N+1) (and other pieces of information stored in the terminal record R43), and stores the generated terminal hash value H(N+2) in the record R43 as a record hash value.

In addition, the client server 3 acquires a time stamp token TS(N+1) for the terminal hash value H(N+2) from the Time Stamp Authority 41. The client server 3 stores the time stamp token TS(N+1), the previous record hash value H(N+2), and a record hash value H(N+3) in the record R44.

Day (N+2) and Day (N+3)

Since day (N+2) and day (N+3) are similar to (N+1) day, detailed description will not be repeated.

Functional Blocks

As in the first embodiment, the client server 3 (processor 31) of the second embodiment includes a chain update unit that updates the time stamp chain 64 by adding a new record to the time stamp chain 64 through a transaction process. The chain update unit of the second embodiment includes a record creation unit different from the record creation unit 733 in the chain update unit 73 (see FIG. 8) of the first embodiment.

Figure 27:
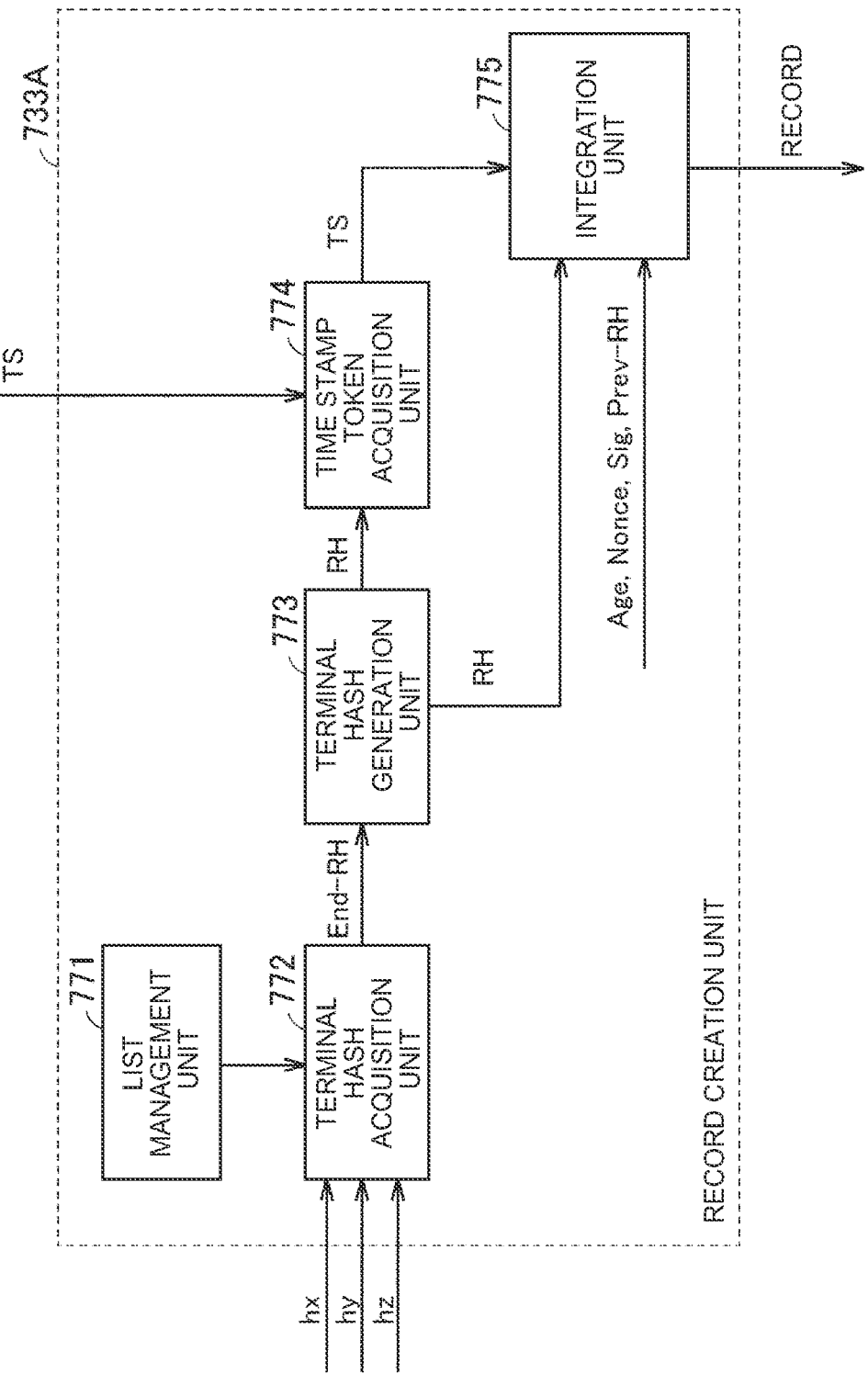
FIG. 27 is a functional block diagram of a record creation unit of the second embodiment.

FIG. 27 is a functional block diagram of a record creation unit 733A of the second embodiment. For example, the record creation unit 733A creates a record to be added to the time stamp chain 64 every predetermined period (every day in this example). The record creation unit 733A includes a list management unit 771, a terminal hash acquisition unit 772, a terminal hash generation unit 773, a time stamp token acquisition unit 774, and an integration unit 775.

The list management unit 771 manages a list that records which evidence chain(s) has (have) been updated between the previous and current executions of the update process. Every time any of the evidence chains is updated, the list management unit 771 adds the updated evidence chain to the list. The list management unit 771 outputs management information based on the list to the terminal hash acquisition unit 772.

The terminal hash acquisition unit 772 acquires, as End-RH, the terminal hash value(s) (at least one out of hx, hy, and hz) of the evidence chain(s) updated between the previous and current executions of the update process, according to the management information in the list. The terminal hash acquisition unit 772 outputs the terminal hash value(s) of the evidence chain(s) to the terminal hash generation unit 773.

The terminal hash generation unit 773 generates a terminal hash value (RH) of the time stamp chain 64 based on the terminal hash value(s) (End-RH) of the evidence chain(s). The terminal hash generation unit 773 may generate a terminal hash value of the time stamp chain 64 by hashing the terminal hash value(s) received from the terminal hash acquisition unit 772. The terminal hash generation unit 773 outputs the terminal hash value for the time stamp chain 64 to the time stamp token acquisition unit 774 and the integration unit 775.

The time stamp token acquisition unit 774 acquires from the Time Stamp Authority 41 a time stamp token (TS) for the record hash value of the record in the time stamp chain 64 that includes the terminal hash value received from the terminal hash generation unit 773. The time stamp token acquisition unit 774 stores the time stamp token in the database 43 (or the storage 36) as a time of confirmation (not shown). The time stamp token acquisition unit 774 also outputs the time stamp token to the integration unit 775.

The integration unit 775 creates a record by integrating various types of information. Specifically, the integration unit 775 creates a record by integrating the terminal hash value or time stamp token of the time stamp chain 64 and other pieces of information (generation (Age), nonce value (Nonce), electronic signature (Sig), and previous record hash value (Prev-RH)). The integration unit 775 outputs the record to the update unit 734 (see FIG. 8).

Process Flow

Figure 28:
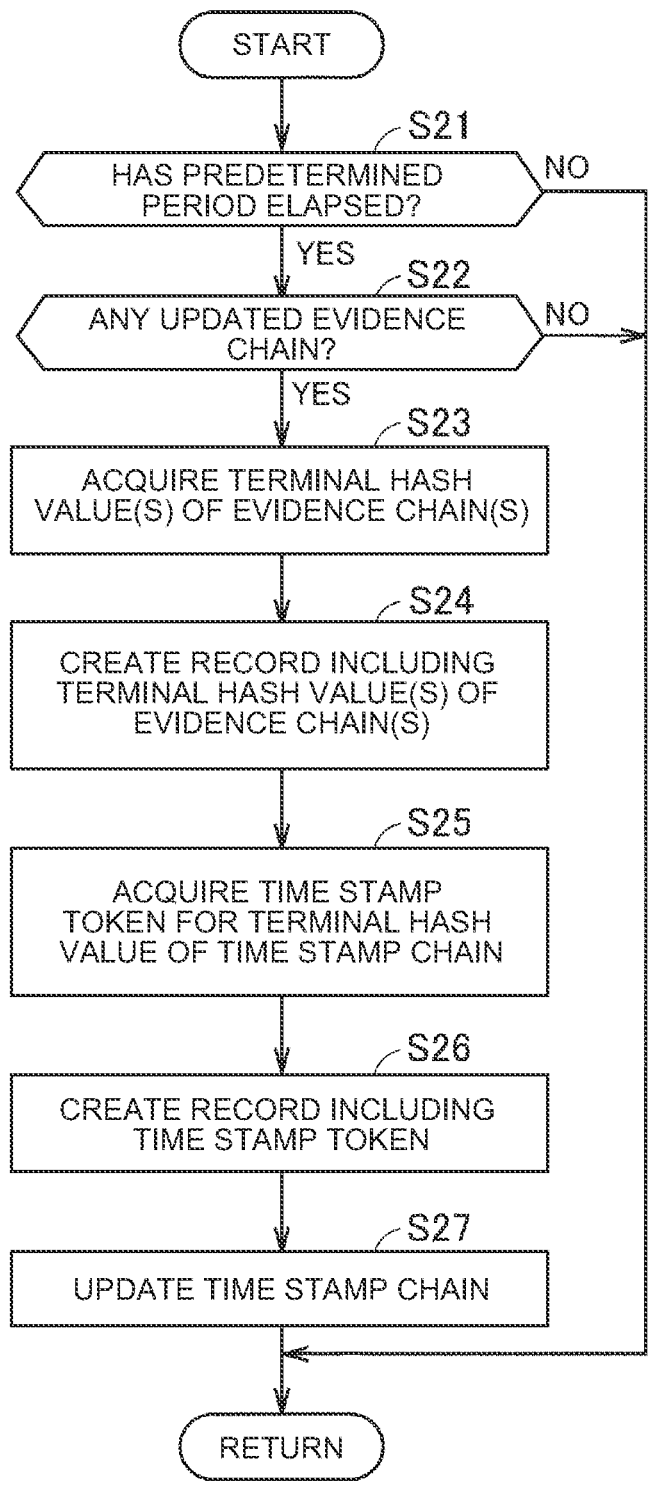
FIG. 28 is a flowchart showing an example of the processing procedure of an update process for the time stamp chain according to the second embodiment.

FIG. 28 is a flowchart showing an example of the processing procedure of the update process for the time stamp chain 64 according to the second embodiment. In S21, the client server 3 determines whether a predetermined period has elapsed since the previous execution of the update process. When the predetermined period has not elapsed (NO in S21), the process returns to the main routine. When the predetermined period has elapsed (YES in S21), the process proceeds to S22.

In S22, the client server 3 determines whether there is any evidence chain that has been updated between the previous and current executions of the update process by, for example, referring to the list described above. When there is no updated evidence chain (NO in S22), the process returns to the main routine. When there is any updated evidence chain (YES in S22), the process proceeds to S23.

In S23, the client server 3 acquires the terminal hash value(s) of the evidence chain(s) that has (have) been updated between the previous and current executions of the update process.

In S24, the client server 3 generates a record hash value (terminal hash value at that time) of the time stamp chain 64 based on the terminal hash value(s) of the evidence chain(s). The client server 3 then creates a first record including the terminal hash value(s) of the evidence chain(s) and the terminal hash value of the time stamp chain 64 (R41, R43, R45, or R47 in the example of FIGS. 25 and 26).

In S25, the client server 3 acquires a time stamp token for the terminal hash value of the time stamp chain 64 (record hash value of the first record) from the Time Stamp Authority 41.

In S26, the client server 3 generates a record hash value based on the time stamp token and other pieces of information. The client server 3 then generates a second record including the time stamp token, the previous record hash value (record hash value of the first record), and the generated record hash value (R42, R44, R46, or R48 in the example of FIGS. 25 and 26).

In S27, the client server 3 updates the time stamp chain 64 by adding the two newly created records.

As in the first embodiment, the client server 3 according to the second embodiment is also configured to execute the file verification process, the time-of-confirmation verification process, and the ordering verification process. Since these processes are the same as those in the first embodiment, detailed description thereof will not be repeated. According to the second embodiment as well, it is possible to verify whether the files and the times of confirmation are properly managed.

Moreover, in the second embodiment, a time stamp token(s) is (are) acquired for the evidence chain(s) whose file(s) (file hash value(s)) has (have) been changed since the previous execution of the update process, while no time stamp token is acquired for the evidence chain(s) whose files have not been changed since the previous execution of the update process. This can reduce the cost for acquiring time stamp tokens (e.g. workload, time, system load, etc.) compared to the case where time stamp tokens are acquired for all the evidence chains or the case where a time stamp token is acquired every time a file is changed. According to the second embodiment, it is therefore possible to efficiently verify whether the files and the times of confirmation are properly managed.

Moreover, in the second embodiment, the update process is executed regularly (once a day in the example shown in FIG. 26). This can reduce the verification cost compared to the case where the update process is executed every time any file is changed. In addition, verification can be performed steadily over a long period of time compared to the case where the update process is executed irregularly.

The embodiments disclosed herein should be considered to be illustrative in all respects and not restrictive. The scope of the present disclosure is set forth by the claims rather than by the above description of the embodiments, and is intended to include all modifications within the meaning and scope equivalent to the claims.

What is claimed is:

1. A data management device comprising:
a storage storing a distributed ledger, the distributed ledger including a plurality of evidence chains and a time stamp chain, the plurality of evidence chains storing in chronological order at least one hash value, the time stamp chain storing in chronological order at least one time stamp token, each hash value being generated from a file, and each time stamp token certifying a time of confirmation; and a processor configured to repeatedly execute an update process such that the time stamp chain is updated, the update process including a process for identifying, out of the evidence chains, at least one evidence chain in which the hash value has been changed with a change in the file since previous execution of the update process, and acquiring the time stamp token for a terminal value generated based on a terminal hash value of the at least one evidence chain.

2. The data management device according to claim 1, wherein
when the processor generates the terminal value, the processor is configured not to use the terminal hash value that has not been changed since the previous execution of the update process.

3. The data management device according to claim 1, wherein
the processor is configured to execute the update process every predetermined period.

4. The data management device according to claim 1, wherein
the processor is configured to execute a first verification process, a second verification process, and a third verification process,
the first verification process is a process for verifying whether at least one file generated from the at least one hash value has been tampered with,
the second verification process is a process for verifying whether at least one time of confirmation certified by the at least one timestamp token has been tampered with, and
the third verification process is a process for verifying ordering of the at least one file and the at least one time of confirmation.

5. The data management device according to claim 4, wherein
the processor is configured to execute at least one out of the first to third verification processes according to an operation of a user on an input device.

6. The data management device according to claim 5, wherein
when a first user operation is performed on the input device, the processor is configured to execute the first to third verification processes on part of the at least one file and the at least one time of confirmation that are selected by the user.

7. The data management device according to claim 6, wherein
when two or more files are selected by the user, the processor is configured to subject at least an oldest file, the time of confirmation immediately before the oldest file, a most recent file, and the time of confirmation immediately after the most recent file to verification.

8. The data management device according to claim 7, wherein
when there is another time of confirmation between the two or more files, the processor is further configured to subjects the another time of confirmation to the verification.

9. The data management device according to claim 5, wherein
when a second user operation is performed on the input device, the processor is configured to execute the first to third verification processes on all of the at least one file and the at least one time of confirmation.

10. The data management device according to claim 5, wherein
when a third user operation is performed on the input device, the processor is configured to execute the third verification process but does not execute the first verification process and the second verification process.

11. A data management method, comprising:
identifying, out of a plurality of evidence chains, at least one evidence chain in which a hash value has been changed with a change in a file since previous execution of an update process for updating a time stamp chain, the plurality of evidence chains storing in chronological order at least one hash value, the time stamp chain storing in chronological order at least one time stamp token, and the plurality of evidence chains and the time stamp chain being included in a distributed ledger, each hash value being generated from a file, and each time stamp token certifying a time of confirmation; and
acquiring the time stamp token for a terminal value generated based on a terminal hash value of the at least one evidence chain.

12. A non-transitory storage medium storing instructions that are executable by one or more processors and that cause the one or more processors to perform functions comprising:
identifying, out of a plurality of evidence chains, at least one evidence chain in which a hash value has been changed with a change in a file since previous execution of an update process for updating a time stamp chain, the plurality of evidence chains storing in chronological order at least one hash value, the time stamp chain storing in chronological order at least one time stamp token, and the plurality of evidence chains and the time stamp chain being included in a distributed ledger, each hash value being generated from a file, and each time stamp token certifying a time of confirmation; and
acquiring the time stamp token for a terminal value generated based on a terminal hash value of the at least one evidence chain.

* * * * *